United States Patent [19]
Kitai et al.

[11] Patent Number: 5,440,750
[45] Date of Patent: Aug. 8, 1995

[54] INFORMATION PROCESSING SYSTEM CAPABLE OF EXECUTING A SINGLE INSTRUCTION FOR WATCHING AND WAITING FOR WRITING OF INFORMATION FOR SYNCHRONIZATION BY ANOTHER PROCESSOR

[75] Inventors: Katsuyoshi Kitai, Hadano; Yasuhiro Inagami, Kodaira; Yoshiko Tamaki, Kunitachi; Yoshikazu Tanaka, Omiya, all of Japan

[73] Assignee: Hitachi, Ltd., Tokyo, Japan

[21] Appl. No.: 643,121

[22] Filed: Jan. 18, 1991

[30] Foreign Application Priority Data

Jan. 23, 1990 [JP] Japan .................. 2-013207

[51] Int. Cl.⁶ .................. G06F 15/16
[52] U.S. Cl. .................. 395/800; 395/550; 364/271; 364/271.2; 364/DIG. 1
[58] Field of Search .................. 395/800, 325, 375, 650, 395/550; 364/271, 271.2, DIG. 1

[56] References Cited

U.S. PATENT DOCUMENTS

| | | | |
|---|---|---|---|
| 4,631,674 | 12/1986 | Blandy .................. | 395/700 |
| 4,636,942 | 1/1987 | Chen et al. .................. | 395/725 |
| 4,827,401 | 5/1989 | Hrustich et al. .................. | 395/550 |
| 4,965,718 | 10/1990 | George et al. .................. | 395/425 |
| 4,965,718 | 10/1990 | George et al. .................. | 395/425 |
| 4,979,105 | 12/1990 | Daly et al. .................. | 395/575 |
| 5,107,420 | 4/1992 | Kametani .................. | 395/650 |
| 5,222,229 | 6/1993 | Fukuda et al. .................. | 395/550 |

OTHER PUBLICATIONS

Paolo Carnevali et al., "Microtasking on IBM Multiprocessors", IBM J. Res. Develop. vol. 30, No. 4, Nov. 1986, pp. 574–582.

Primary Examiner—Alyssa H. Bowler
Assistant Examiner—John Harrity
Attorney, Agent, or Firm—Antonelli, Terry, Stout & Kraus

[57] ABSTRACT

Each processor of a multiprocessor system which shares a main storage has a execution circuit for executing a compare and watch instruction provided for watching information for synchronization written into a main storage. When one program being executed by one of the processors issues an instruction, the circuit fetches information for synchronization from a location within the main storage designated by the instruction, compares that fetched information with another information designated by the instruction. If they do not have a specific relation, the fetching and the comparison is repeated. The circuit has a circuit for limiting the repetition with a limited number of times. The circuit further has a circuit for counting a total amount of CPU time spent for execution of plural watching instructions issued by the same program.

19 Claims, 24 Drawing Sheets

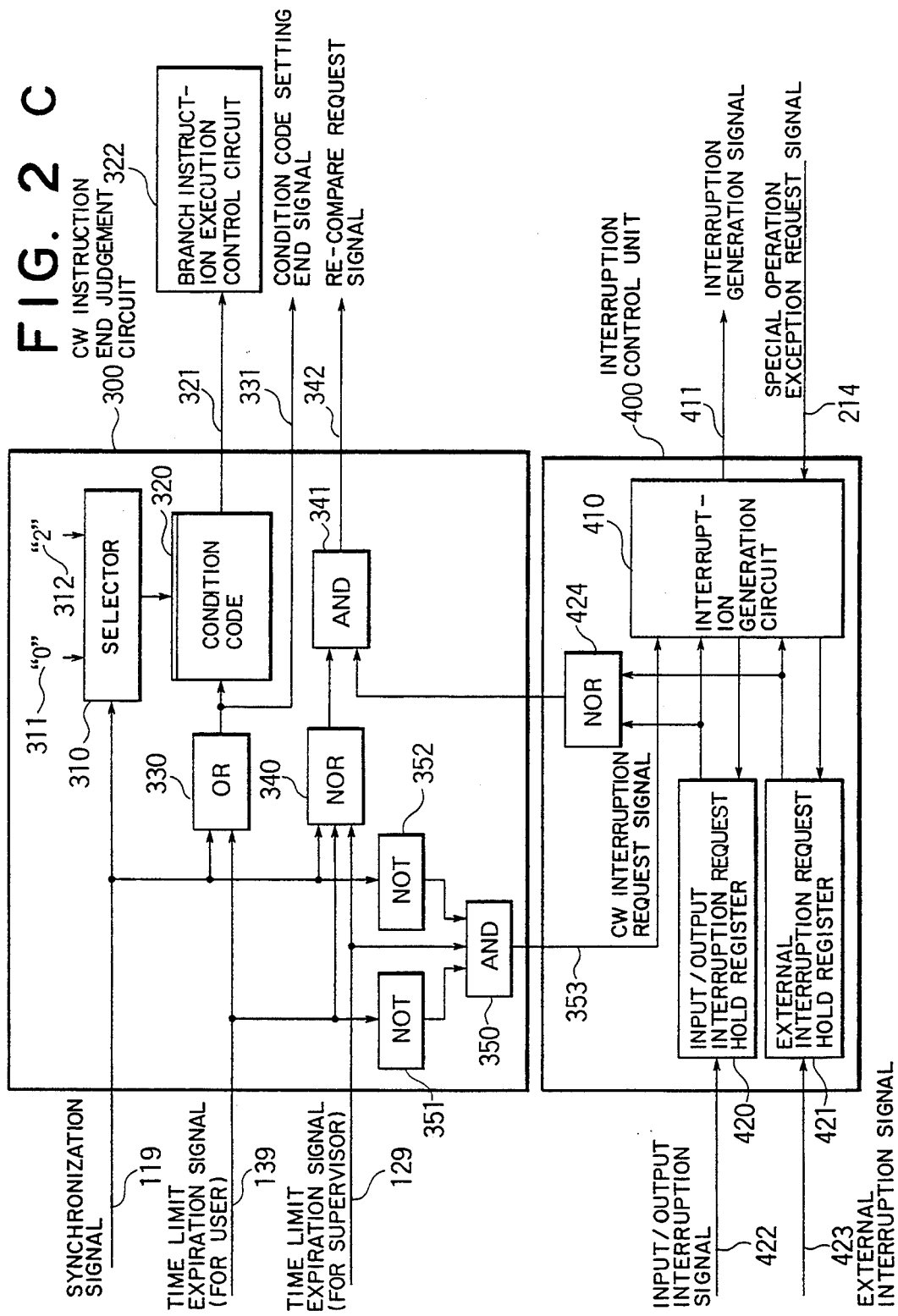

INSTRUCTION FORMAT : CW R1,R2 (R1,R2 : GENERAL PURPOSE REGISTER NUMBER)

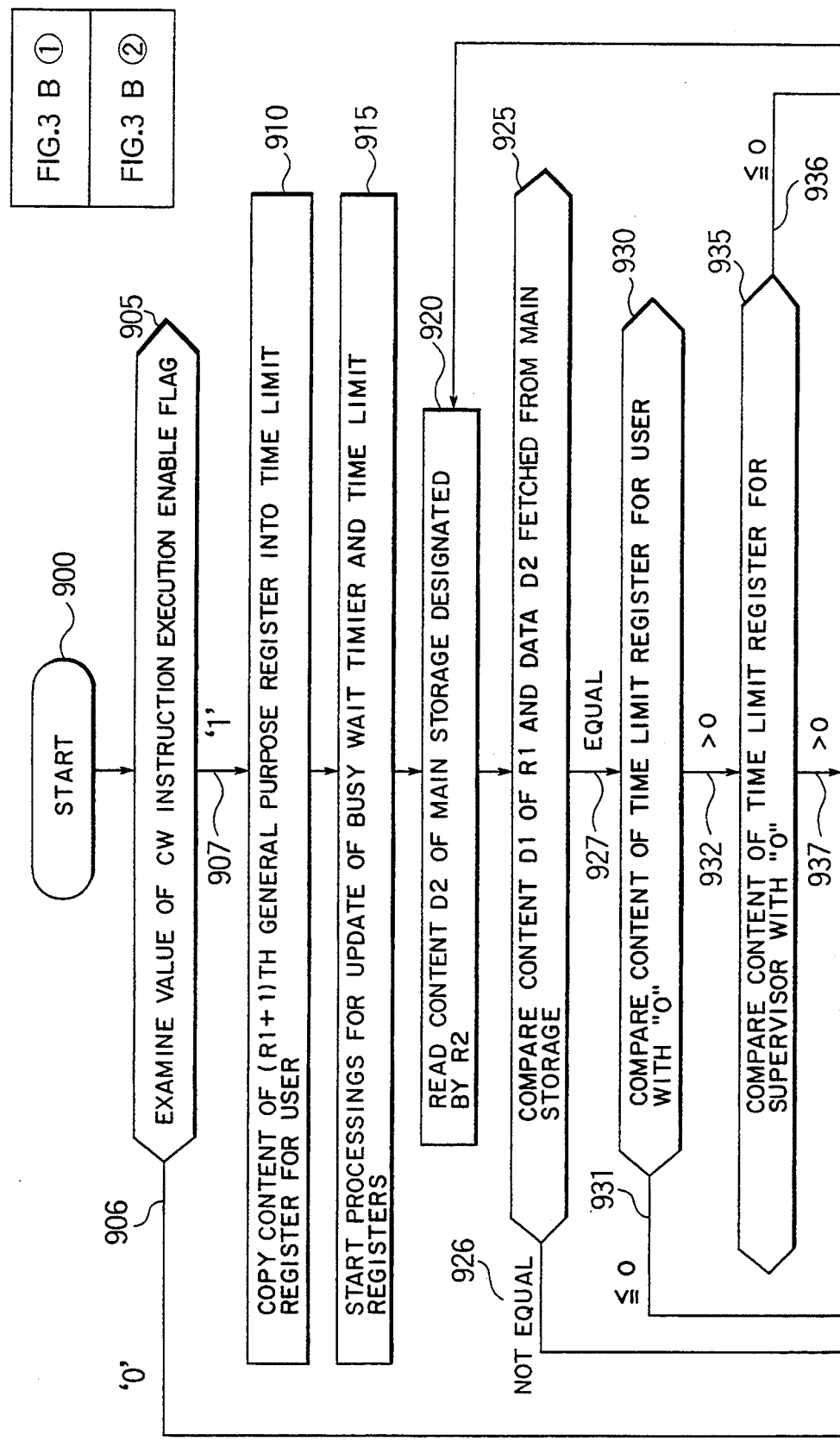

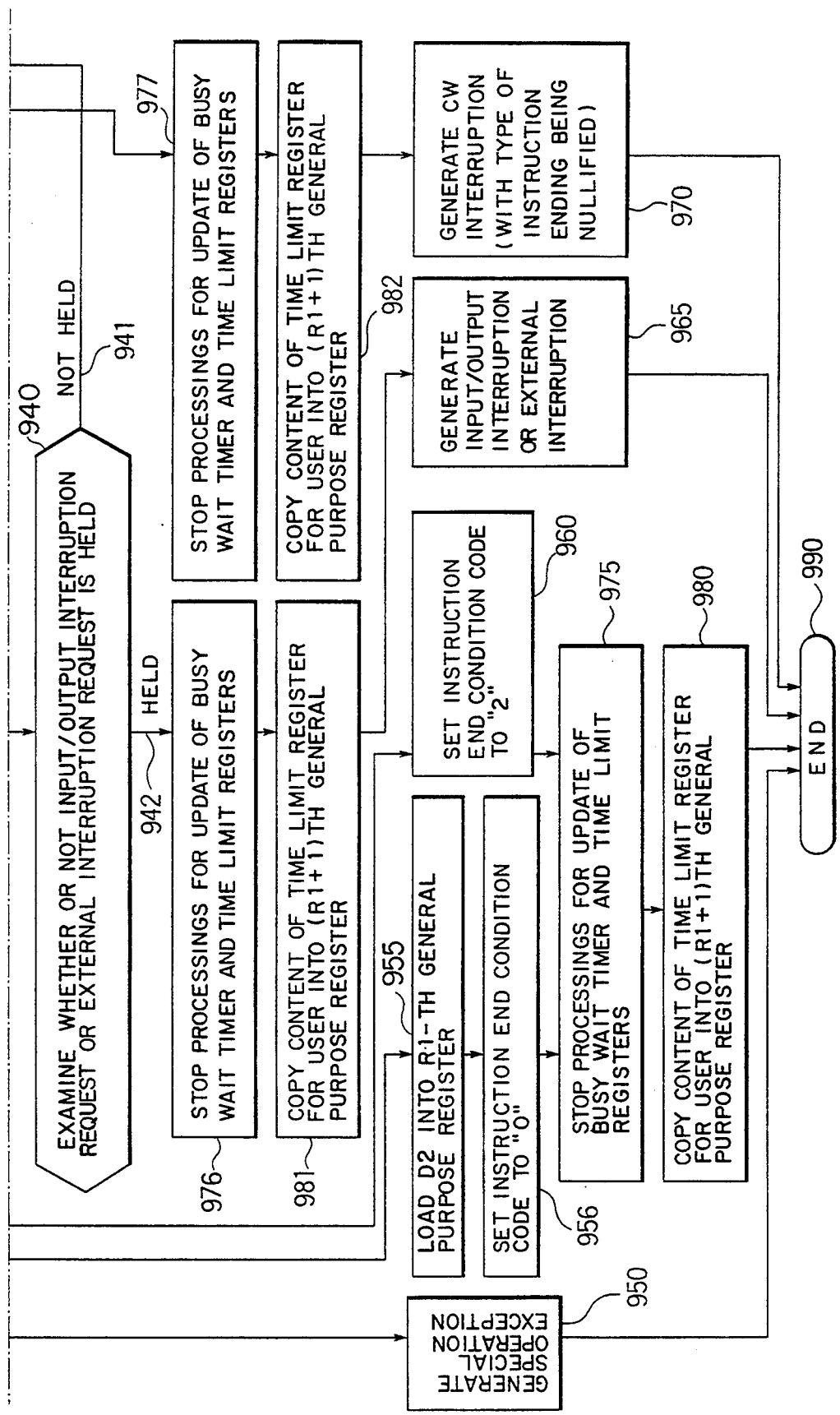

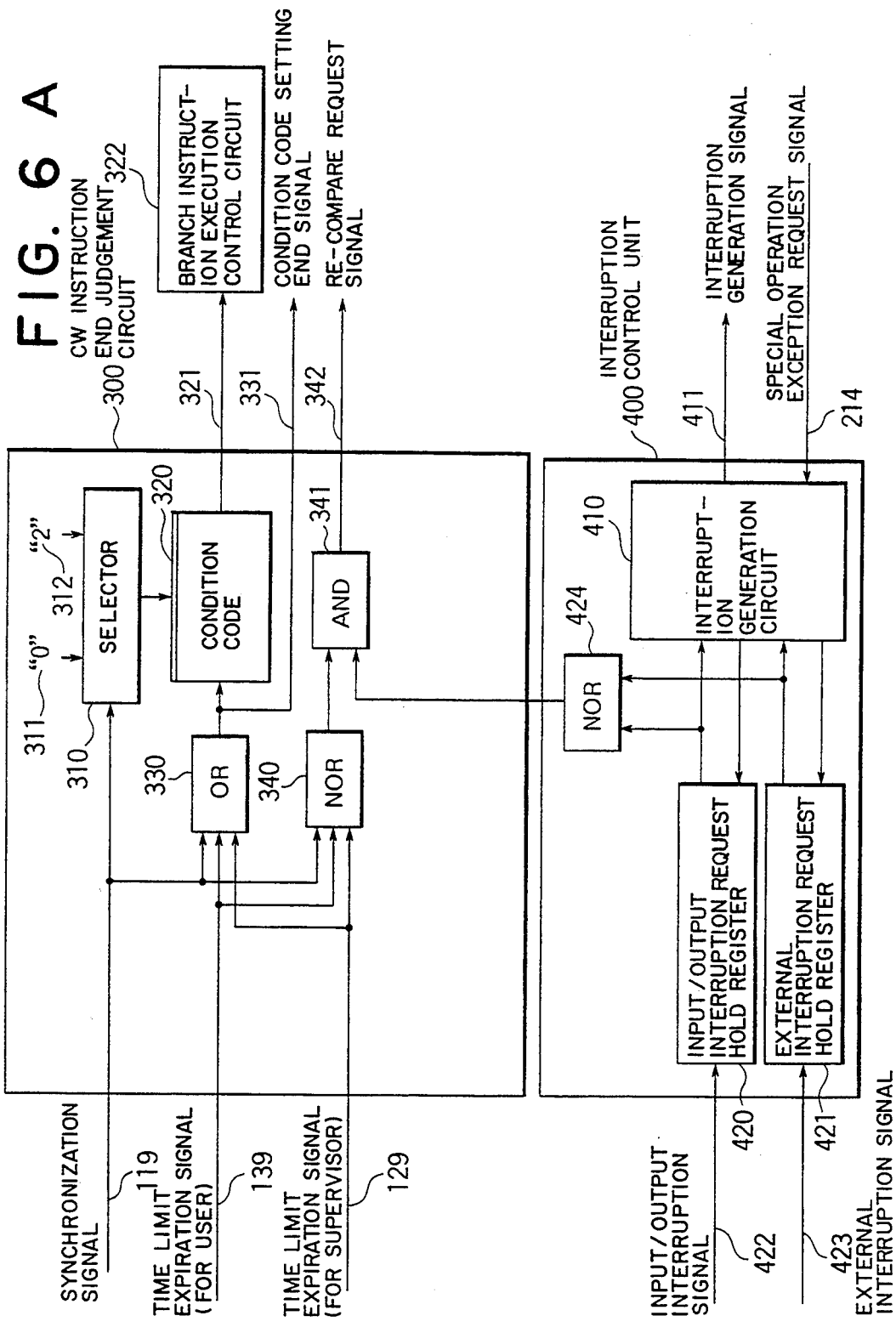

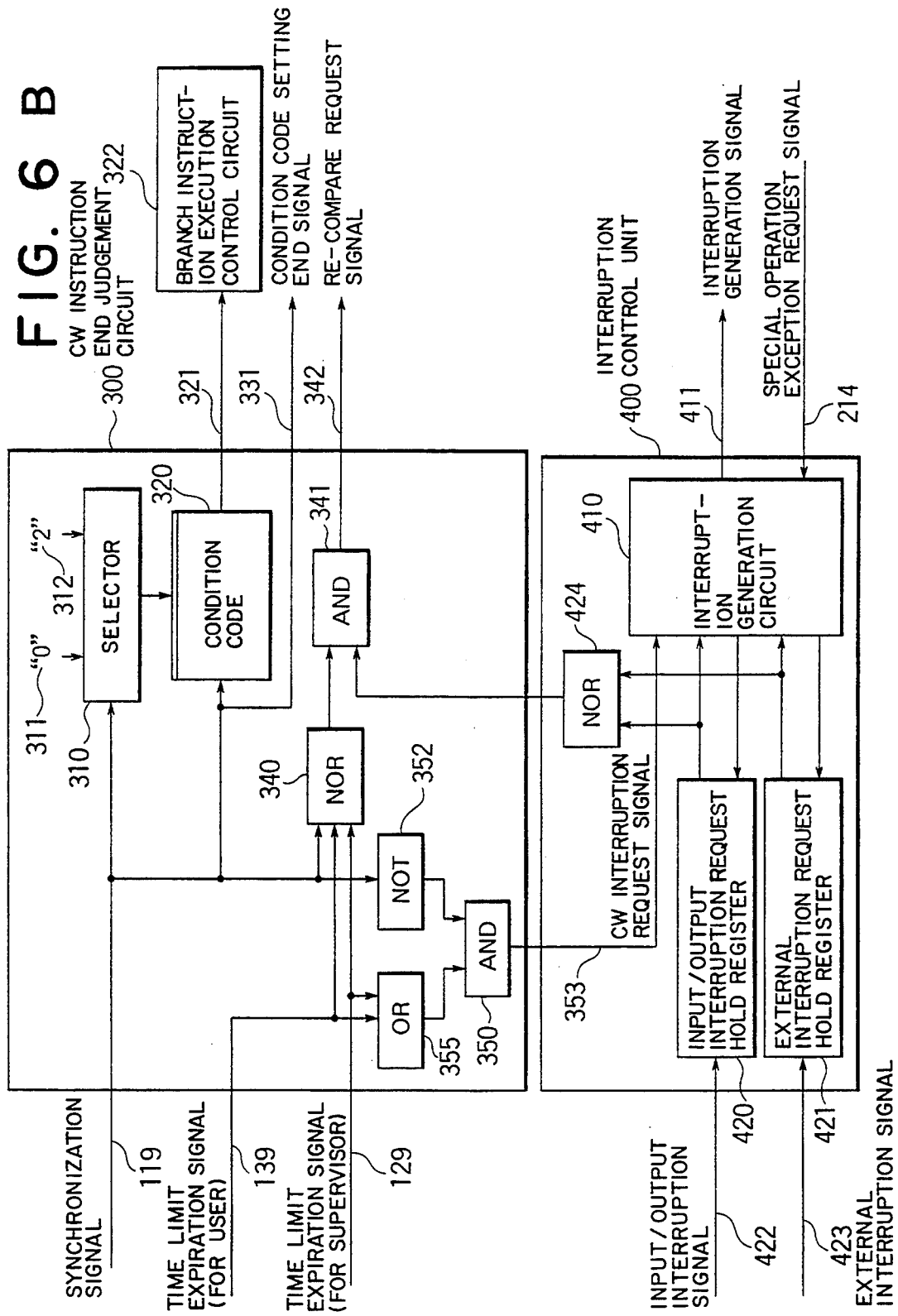

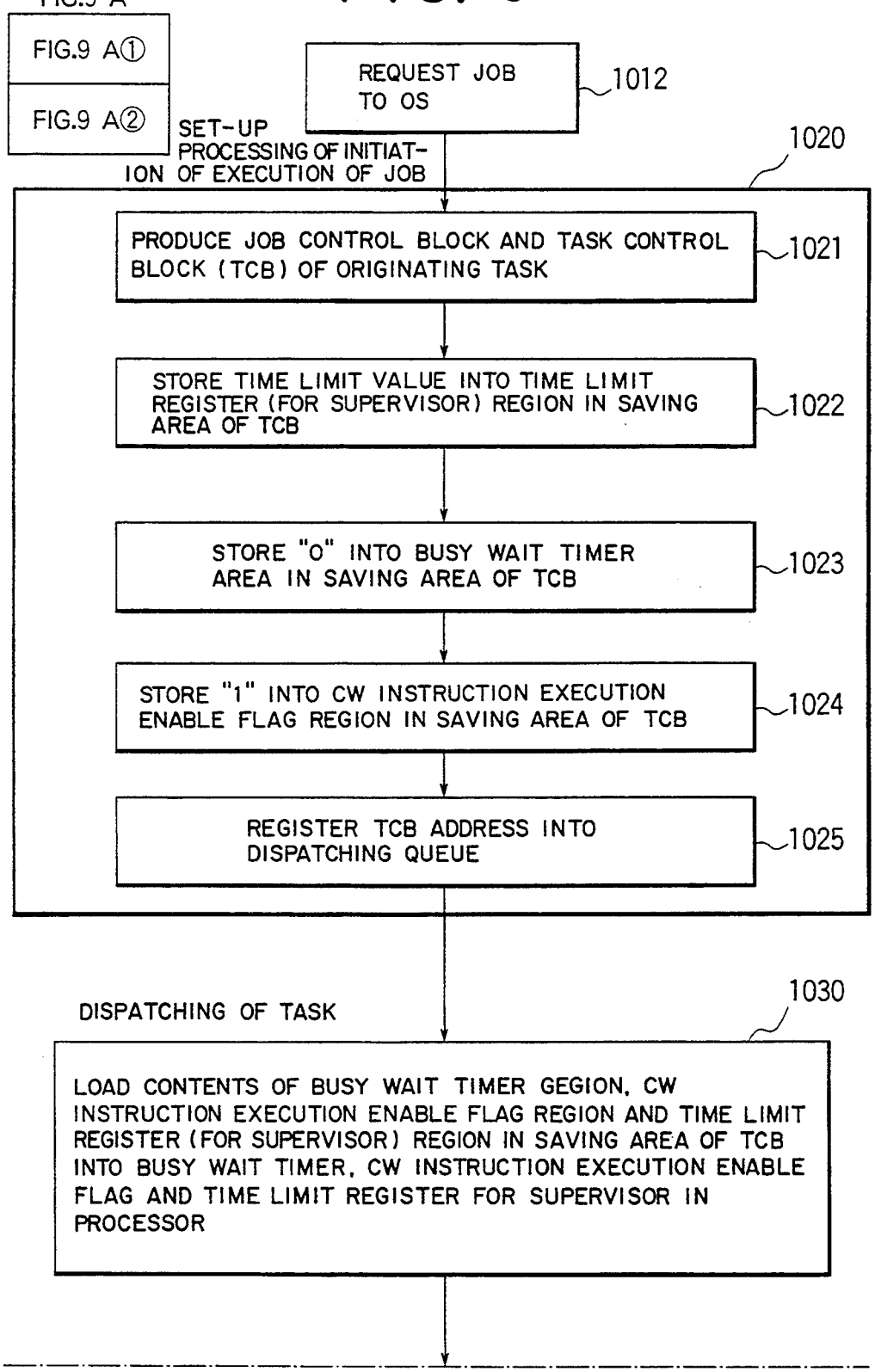

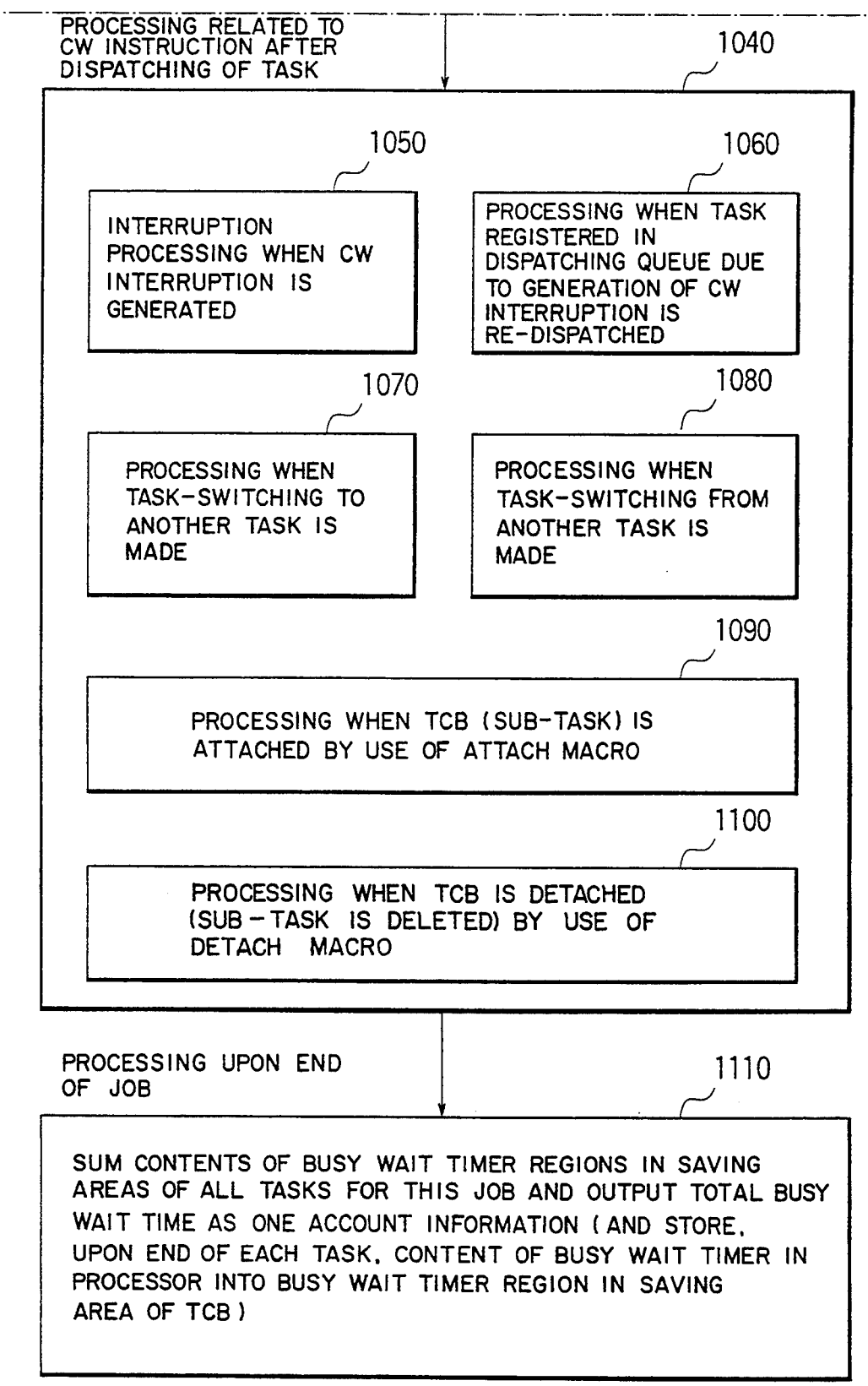
FIG. 9 A ②

PROCESSING WHEN TASK REGISTERED IN DISPATCHING QUEUE DUE TO OCCURENCE OF CW INTERRUPTION IS RE-DISPATCHED

FIG. 12

| INSTRUCTION SEQUENCE OF ORIGINATING TASK | | | INSTRUCTION SEQUENCE OF SUB-TASK | | |
|---|---|---|---|---|---|
| | MVI SEM,1 | ~ 2104 | | | |
| | MVI MACRO1,0 | ~ 2108 | | | |
| | ATTACH TCB1 | ~ 2112 | | MVI NEW,1 | ~ 2204 |
| | | | | MVI MACRO2,0 | ~ 2208 |
| | INSTRUCTION SEQUENCE 11 | ~ 2116 | | INSTRUCTION SEQUENCE 21 | ~ 2212 |
| | L GR2,=F'1' | ~ 2120 | | MVI SEM,0 | ~ 2216 |
| | L GR3,=F'100' | ~ 2124 | | CLI MACRO1,1 | ~ 2220 |
| | LA GR4,SEM | ~ 2128 | | BNE L3 | ~ 2224 |
| | CW GR2,GR4 | ~ 2132 | | POST ECB1 | ~ 2228 |
| | B CC=0,L1 | ~ 2136 | | | |
| | MVI MACRO1,1 | ~ 2140 | | | |
| | WAIT ECB1 | ~ 2144 | | | |
| L1: | | ~ 2152 | | | |
| | INSTRUCTION SEQUENCE 12 | ~ 2156 | | | |
| | MVI NEW,0 | ~ 2160 | L3: | L GR2,=F'1' | ~ 2236 |
| | CLI MACRO2,1 | ~ 2168 | | L GR3,=F'100' | ~ 2240 |
| | BNE L2 | ~ 2172 | | LA GR4,NEW | ~ 2244 |
| | POST ECB2 | ~ 2176 | | CW GR2,GR4 | ~ 2248 |
| L2: | | ~ 2178 | | B CC=0,L4 | ~ 2252 |
| | | | | MVI MACRO2,1 | ~ 2256 |
| | INSTRUCTION SEQUENCE 13 | | | WAIT ECB2 | ~ 2260 |
| | | | L4: | | ~ 2264 |
| | | ~ 2182 | | INSTRUCTION SEQUENCE 23 | ~ 2268 |
| | ⋮ | | | ⋮ | |
| | | ~ 2186 | | | ~ 2272 |
| | DETACH TCB1 | ~ 2190 | | | |

INFORMATION PROCESSING SYSTEM CAPABLE OF EXECUTING A SINGLE INSTRUCTION FOR WATCHING AND WAITING FOR WRITING OF INFORMATION FOR SYNCHRONIZATION BY ANOTHER PROCESSOR

This invention is related to a U.S. patent application No. 07/647,754 entitled "IN PROCESSOR SYSTEM FOR EXECUTING PROCESSES IN PARALLEL UNDER MULTITASK, CONTROL METHOD OF WAITING FOR EVENT OF PROCESS" filed by Y. Tamaki et al on Jan. 30, 1991, now U.S. Pat. No. 5,193,186, under claiming priority of Japanese Patent Application No. Hei 2-26449, the contents of the U.S. Patent Application are incorporated herein by reference.

BACKGROUND OF THE INVENTION

The present invention relates to an information processing system for multitasking.

A first method of accomplishing synchronization between instruction processors, which perform parallel processing (or multitasking), is disclosed in U.S. Pat. No. 4,636,942 entitled "COMPUTER VECTOR MULTIPROCESSING CONTROL" and issued Jan. 13, 1987. In the method disclosed by this patent, a one-bit semaphore register used in common by all of processors is provided and a test and set instruction is provided for the semaphore register. A processor having executed a test and set instruction stops to issue the succeeding instruction during a time when the semaphore register is "0" or until the semaphore register is set to "1" by another processor. Thus, high-speed synchronization is accomplished by synchronizing one of processors with the other processor with allowing the processor to test the semaphore register continually.

As a second method of accomplishing high-speed synchronization between parallel-processing (or multitasking) processors is known by the following technique. Namely, a compare instruction and a branch instruction are combined to form a spin loop and the number of times of looping is set to a predetermined value. When the predetermined number of times of looping is reached, the spin loop is passed through and the control is delivered to an operating system (OS) by a supervisor call. One example will described by use of known instructions employed by the M series processor. In this instruction sequence, the number 100 of times of looping is set to GR2 for a wait for the content of SEMAPHORE to take "1" through the spin loop.

```
        L    GR3, = F'1'
        L    GR2, = F'100'
LABEL1  C    GR3, SEMAPHORE
        BE   LABEL2
        BCT  GR2, LABEL1
        SVC
LABEL2  NOP
```

The above-mentioned prior art involves the following problems.

In the first conventional method in which the synchronization is accomplished between processors, the execution of a test and set instruction is infinitely continued with each processor being exclusively used until the semaphore register is set to "1". Under a multi-job environment, however, there may take place the case where another job can be executed with the intervention of an operating system (OS) in a time until the semaphore register is set to "1". Therefore, especially in the multi-job environment, the first method has a problem that the system throughput is deteriorated.

In the second conventional method, on the other hand, the problem in the first problem does not arise since the number of times of spin looping is set. In a multi-job environment, however, since a job subjected to parallel processing and another job are executed in a co-existing form, a time required for synchronization may differ at every execution. Namely, since a CPU time differs at every execution, an account is not stabilized or the tuning of a program cannot be made. This problem does not arise if it is possible to measure a time required for synchronization so as to determine a CPU time from which the time required for synchronization is subtracted. In the second conventional method, however, the measurement of the time required for synchronization needs executing supervisor call instructions upon start and end of a spin loop to generate supervisor call interruptions and obtaining information of CPU times consumed at both the points of time from an OS to determine a difference therebetween. But, there is a problem that the generation of interruptions results in a very large overhead, thereby losing the significance of the performance of a high-speed synchronization processing by the spin loop with the exclusive possession of each processor being taken.

The second conventional method further has the following problem.

In general, each processor is provided with a buffer storage to contemplate high-speed execution of an instruction. The copy of a part of a main storage is held in the buffer storage. In the case when a multitasking is performed while accomplishing synchronization between a plurality of processors, the synchronization must be accomplished by use of common data such as the above-mentioned SEMAPHORE which exists at the same position in the main storage. Namely, the synchronization is accomplished in such a manner that a first processor waits for SEMAPHORE to become "1" and a second processor stores "1" into SEMAPHORE.

The buffer storage in the first processor holds the copy of the content of SEMAPHORE in the main storage, thereby contemplating a high-speed processing for comparison. Accordingly, when the second processor rewrites the content of SEMAPHORE in the main storage into "1", SEMAPHORE held by the buffer storage in the first processor is invalidated. As a result, when the first processor makes again the comparison of the content of SEMAPHORE with "1", the copy of SEMAPHORE in the main storage is not present in the buffer storage in the first processor. Therefore, the judgement of the accomplishment of synchronization can be made by performing a comparison processing after the content of SEMAPHORE as newly rewritten has been block-transferred from the main storage to the buffer storage.

Thus, since the block transfer occurs when SEMAPHORE becomes "1" and the synchronization is accomplished, the second conventional method involves a problem that a long time is required from the accomplishment of synchronization until the execution of the next instruction. On the other hand, if a method is employed in which the content of SEMAPHORE is fetched directly from the main storage, there is no occurrence or need of block transfer upon accomplishment of synchronization though it is not possible to perform a comparison processing itself at a high speed.

SUMMARY OF THE INVENTION

The present invention is made to solve the above problems.

An object of the present invention is to provide an information processing system in which high-speed synchronization between instruction processors can be accomplished under a multi-job environment and a time required for a busy wait can be measured with no overhead.

Another object of the present invention is to provide an information processing system in which the time required for the busy wait can be reflected in an account for jobs.

To that end, in an information processing system of the present invention including first and second instruction processors, the first processor is provided with comparing means responsive to an instruction for accomplishment of synchronization of the first processor with the second processor for repetitively comparing first data rewritable or alterable by the second processor and second data for synchronization determined by the first processor to output a signal indicative of the accomplishment of synchronization when a predetermined result of comparison is obtained, and means for completing the execution of the instruction for accomplishment synchronization when a present upper limit time elapses with the predetermined result of comparison being not obtained by the comparing means.

The first data is data in a main storage shared by the first and second processors. The second data is data held in that one of plural registers provided in the first processor which is designated by the instruction for accomplishment of synchronization, and the present upper limit time is a time held in the other of the plural processors which is designated by the instruction for accomplishment of synchronization.

The first processor may be further provided with interruption generating means for generating, in the case when an interruption from the exterior of the first processor is held when the repetitive comparison is made until the preset upper limit time is reached, the held interruption to complete the execution of the instruction for accomplishment of synchronization.

The first processor may be further with means for indicating whether or not the execution of the instruction for accomplishment of synchronization should be permitted and interruption generating means for generating, in the case where the first processor tries to execute the instruction for accomplishment of synchronization when the execution of the instruction for accomplishment of synchronization is not permitted by the indicating means, generating an interruption to complete the execution of the instruction.

BRIEF DESCRIPTION OF THE DRAWINGS

FIGS. 6A and 6B are circuit diagrams showing the details of a CW instruction end judgement circuit and an interruption control unit in still further embodiments of the present invention;

FIGS. 10A and 1 concern still another embodiment of the present invention, FIG. 10A being a circuit diagram showing the details of a CW instruction execution unit and FIG. 10B being a circuit diagram showing the details of a CW instruction end judgement circuit and an interruption control unit; and FIGS. 11 and 12 show another embodiment using a CW instruction.

DESCRIPTION OF THE PREFERRED EMBODIMENTS

Embodiments of the present invention will now be described in detail.

(1) FORMAT OF CW INSTRUCTION

An example of the format of a compare and wait instruction (hereinafter referred to as CW instruction) according to an embodiment of the present invention will be explained in reference with FIG. 3A.

Figure 3:
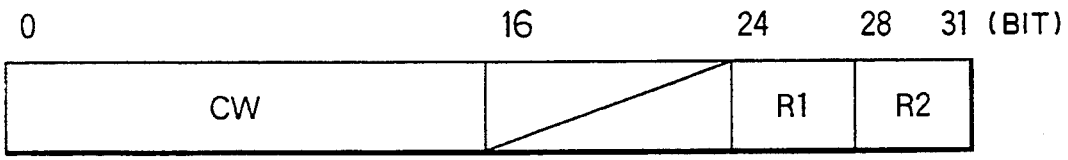
FIGS. 3A and 3B show the format of and the procedure for a compare and wait (CW) instruction according to the present invention.

The format of the CW instruction is shown in FIG. 3A. The length of the instruction is thirty two bits (or four bytes). Bits 0 to 15 designate an operation code. An R1 field of bits 24 to 27 designates a pair of general purpose registers and an R2 field of bits 28 to 31 designates a general purpose register number. Bits 16 to 23 are ignored. In the following, the register numbers of the paired general purpose registers designated by the R1 field are represented by R1 and R1+1 and the register number of the general purpose register designated by the R2 field is represented by R2.

The content of the general purpose register R2 represents an address of a main storage, and data stored at this address of the main storage and the content of the general purpose register R1 are compared with each other. The maximum execution time of the CW instruction is designated by the general purpose register R1+1.

The CW instruction accomplishes synchronization between instruction processors by continuing the comparison processing until the content of data stored of the main storage its address designated by the general purpose register R2 and the content of the general purpose register R1 become unequal to each other. When both the contents become unequal to each other, the execution of the CW instruction is completed with a condition code of "0". In the case where the maximum execution time has been elapsed while the comparison processing is being continuously performed, the execution of the CW instruction is completed with a condition code of "2".

(2) OUTLINE OF OPERATION OF CW INSTRUCTION

First of all, an example of programming in a multitasking using CW instructions which are an embodiment of the present invention and instructions which are employed by the M series processor, will be shown by use of FIG. 12. In FIG. 12, reference numerals 2104 to 2190 designate an instruction sequence of an originating task and numerals 2204 to 2272 designate an instruction sequence of a sub-task.

Now assume that parallel processing of the originating task and the sub-task is performed in such a manner that the originating task is executed by a processor 0 and the sub-task is executed by a processor 1.

Firstly, the execution of an originating task is started. The originating task initializes common data SEM and MACRO1 into "1" and "0", respectively (2104, 2108). Thereafter, by use of an ATTACH macro, a task control block TCB is attached or a sub-task is created (2112). When the sub-task is created by the ATTACH macro, the execution of the sub-task is started. The sub-task initializes common data NEW and MACRO2 into "1" and "0", respectively (2204, 2208). The originating task executes an instruction sequence 11 (2116) and the sub-task executes an instruction sequence 21 (2212), so that parallel processing of the originating task and the sub-task is performed.

When completing the execution of the instruction sequence 11, the originating task waits for the sub-task to complete the instruction sequence 21. In the shown instruction sequence, the common data SEM and MACRO1 are used to accomplish synchronization between the originating task and the sub-task. The originating task loads "1" and "100" into the 2nd and 3rd general purpose registers, respectively (2120, 2124) and sets a main storage address of the common data SEM into the 4th general purpose register (2128). Thereafter, by use of a CW instruction, a synchronization processing based on a busy wait is performed by continuing a comparison processing until the value of SEM becomes unequal to "1" so that the synchronization is accomplished or until the maximum execution time "100" of CW instruction is elapsed (2132). In the case where a condition code CC upon completion of the execution of the CW instruction is "0", it is meant that the synchronization has been accomplished. Therefore, a branch to L1 is made (2136, 2152) and the succeeding instruction sequence 12 is executed (2156). In the case where the condition code upon completion of the execution of the CW instruction is "2", the synchronization has not yet been accomplished. In this case, "1" is set into MACRO1 in order to indicate a wait for synchronization through an OS (2140) and thereafter the wait for synchronization through the OS is taken by a WAIT macro (2144).

On the other hand, when completing the execution of the instruction sequence 21, the sub-task notifies to the originating task the completion of the instruction sequence executed in parallel with the originating task to accomplish synchronization with the originating task. The sub-task rewrites SEM into "0" to notify the completion of the execution of the instruction sequence 21 to the originating task which is waiting for SEM to become unequal to "1" in accordance with the CW instruction (2216). Next, whether or not MACRO1 is "1" is examined to check whether the originating task's wait for synchronization with the sub-task is taken by the CW instruction or the WAIT macro (2220). The case where MACRO1 is not "1" corresponds to the wait for synchronization taken by the CW instruction. In this case, the notification of the completion of execution of the instruction sequence has already been completed (2216). Then, a branch to L3 is made and the succeeding instruction sequence is executed (2224, 2236). The case where MACRO1 is "1" corresponds to the wait for synchronization taken by the WAIT macro. In that case, a POST macro is executed to notify the completion of execution of the instruction sequence (2228).

Upon reception of the notification of the instruction sequence execution completion from the subtask, the originating task executes the succeeding instruction sequence 12 (2156). During a time when the originating task is executing the instruction sequence 12, the sub-task waits for the originating task to notify an event which newly instructs the execution of an instruction sequence. In the shown instruction sequence, common data NEW and MACRO2 are used so that the sub-task has a wait for the event notification from the originating task. The sub-task loads "1" and "100" into the 2nd and 3rd general purpose registers, respectively (2236, 2240) and sets a main storage address of the common data NEW into the 4th general purpose register (2244). Thereafter, by use of a CW instruction, a comparison processing is continued for a busy wait until the value of NEW becomes unequal to "1" and the event is notified or until the maximum execution time "100" of CW instruction is elapsed (2248). In the case where a condition code CC upon completion of the execution of the CW instruction is "0", it is meant that the event has been notified. Therefore, a branch to L4 is made (2252, 2264) and the succeeding instruction sequence 23 is executed (2268). In the case where the condition code upon completion of the execution of the CW instruction is "2", the event has not yet been notified. Therefore, "1" is set into MACRO2 in order to indicate a wait for the notification of the event through the OS (2256) and thereafter the wait for the notification of the event through the OS is taken by a WAIT macro (2260).

On the other hand, when completing the execution of the instruction sequence 12, the originating task notifies an event to the sub-task in order to newly perform parallel processing. The originating task rewrites NEW into "0" to notify the event to the sub-task which is waiting for NEW to become unequal to "1" in accordance with the CW instruction (2160). Next, whether or not MACRO2 is "1" is examined to check whether the sub-task's wait for the notification of the originating task is taken by the CW instruction or the WAIT macro (2168). The case where MACRO2 is not "1" corresponds to the wait for the event notification taken by the CW instruction. In this case, the event notification has already been completed. Then, a branch to L2 is made and the succeeding instruction sequence 13 is executed (2172, 2178). The case where MACRO2 is "1" corresponds to the wait for the event notification taken by the WAIT macro. In that case, a POST macro is executed to notify the event (2176). Thereafter, the originating task executes the instruction sequence 13 (2182) and the sub-task executes the instruction sequence 23 (2268), so that parallel processing of the originating task and the sub-task is performed.

The above processing is repeated. Namely, there is repeated a processing in which the sub-task waits for an instruction of the execution of a new instruction sequence from the originating task, parallel processing of the originating task and the sub-task is performed and the originating task waits for the completion of the execution of the instruction sequence by the sub-task (2186, 2272).

Finally, the originating task detaches the TCB or deletes the sub-task by use of a DETACH macro (2190).

Now, the outline of the operation of a CW instruction will be explained by virtue of a flow chart shown in FIG. 3B. Detailed explanation of an embodiment of a processing system for realizing the operation of the CW instruction will be made in later.

(a) Firstly, the value of a CW instruction execution enable flag is examined in order to judge whether or not the execution of a CW instruction is permitted (step 905). The CW instruction execution enable flag is preliminarily set with "0" or "1" by a supervisor (OS). The setting of the flag to "1" indicates that the execution of the CW instruction is authorized and the setting of the flag to "0" indicates that the execution is not authorized.

(b) In the case where the value of the CW instruction execution enable flag is "0" (step 906), a special operation exception is detected (step 950), thereby suppressing the execution of the CW instruction (step 990).

(c) In the case where the value of the CW instruction execution enable flag is "1" (step 907), the content of the (R1+1)th general purpose register designated by the R1 field of the CW instruction is copied into a time limit register for user (step 910). Also, the content of a time limit register for supervisor (OS) is copied into an internal time limit register for supervisor. After coping, the count-up of a busy wait timer, the count-down of the time limit register for user and the count-down of the internal time limit register for supervisor are started (step 915). The busy wait timer is a timer for measuring a CW instruction execution time and is used to measure a busy wait time required for synchronization between processors. Unlike the time limit register for supervisor and the time limit register for user, the value of the busy wait timer is not reset each time a CW instruction is executed. Therefore, the busy wait timer can provide an accumulated value of busy wait times over a plurality of CW instructions. By informing a system administer or a user of the value of the busy wait timer by an operating system, the system administer can reflect the busy wait time in a user's account or the user can reflect it in the tuning of a parallel-processing program. The time limit register is a register for setting therein the upper limit value of a busy wait time caused by a CW instruction of once and is used to prevent the busy wait time from becoming too long. The time limit register for user and the time limit register for supervisor (OS) are prepared.

(d) The content D2 of the main storage at its address designated by the R2-th general purpose register designated by the R2 field of the CW instruction is fetched (step 920).

(e) The content of the R1-th general purpose register designated by the R1 field of the CW instruction is compared with D2 (step 925).

(f) In the case where both the contents are not equal to each other (step 926), it is meant that a processing for synchronization between processors by the CW instruction has normally been finished. Therefore, D2 is loaded into the R1-th general purpose register (step 955), a condition code is set to "0" (step 956), the processings for update of the busy wait timer and the time limit registers are stopped (step 975), and the content of the time limit register for user is copied into the (R1+1)th general purpose register (step 980), thereby completing the execution of the CW instruction (step 990).

(g) In the case where both the contents compared in step 925 are equal to each other (step 927), the content of the time limit register for user is examined (step 930).

(h) In the case where the content of the time limit register for user is equal to or smaller than 0, that is, in the case where the limit of the CW instruction execution time has been reached (step 931), the condition code is set to "2" (step 960), the processings for update of the busy wait timer and the time limit registers are stopped (step 975), and the content of the time limit register for user is copied into the (R1+1)th general purpose register (step 980), thereby completing the execution of the CW instruction (step 990).

(i) In the case where the content of the time limit register for user is larger than 0 (step 932), the content of the internal time limit register for supervisor is examined (step 935).

(j) In the case where the content of the internal time limit register for supervisor is equal to or smaller than 0, that is, in the case where the limit of the CW instruction execution time has been reached (step 936), the processing for update of the busy wait timer and the time limit registers are stopped (step 977), the content of the time limit register for user is copied into the (R1+1)th general purpose register (step 982), and a CW interruption with the type of instruction ending being nullified is generated (step 970), thereby completing the execution of the CW instruction (step 990). Thus, it is possible to deliver the control to the supervisor (OS).

(k) If the content of the internal time limit register for supervisor is larger than 0 (step 937), whether or not an input/output interruption factor or an external interruption factor is held is examined in order to accept an interruption from the exterior of the processor (step 940).

(l) In the case where no interruption factor is held (step 941), the flow returns to step 920. Namely, synchronization between processors is accomplished by a busy wait.

(m) In the case where an interruption factor is held (step 942), the processings for update of the busy wait timer and the time limit registers are stopped (step 976), the content of the time limit register for user is copied into the (R1+1)th general purpose register (step 981), and the held input/output interruption or external interruption is generated (step 965), thereby completing the execution of the CW instruction (step 990).

As mentioned above, during a time set to the time limit register as long as no input/output interruption request or external interruption request is occurred, the execution of a CW instruction is continued until the content of a main storage at its address designated by the content of a general purpose register designated by the R2 field of the CW instruction and the content of a general purpose register designated by the R1 field of the CW instruction become unequal to each other. Namely, a busy wait is taken to accomplish synchronization between processors. Also, a busy wait time is measured by the busy wait timer and a stabilized account can be determined by subtracting the busy wait time from the overall CPU time even in the case where the busy wait time differs at every execution, as under a multi-job environment.

(3) OPERATION OF CW INSTRUCTION

Next, an embodiment of an information processing system of the present invention for realizing the above-mentioned operation of the CW instruction will be explained in detail by use of FIG. 1 and FIGS. 2A to 2C.

(3-a) Description of Outline

Figure 1:
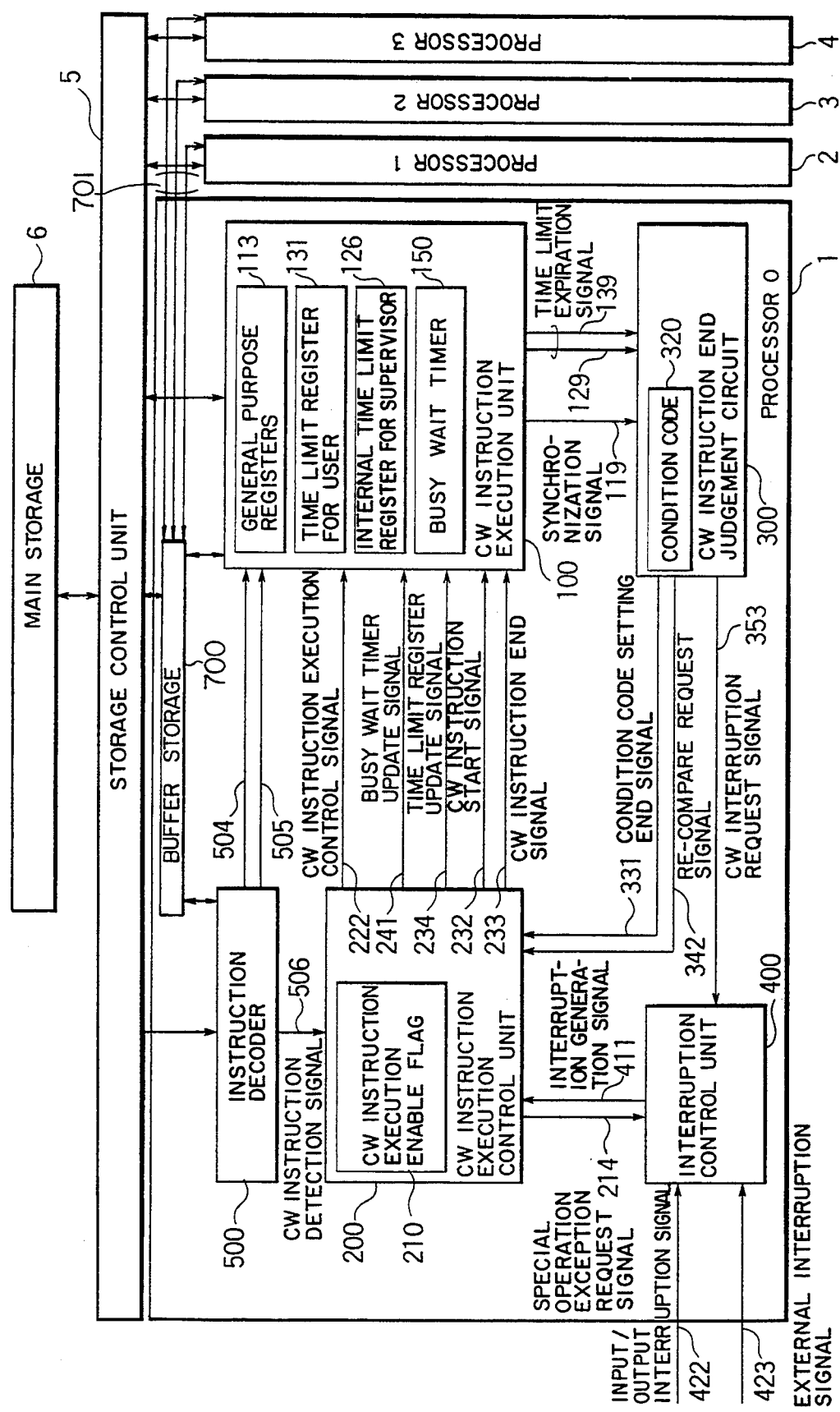
FIG. 1 is a schematic block diagram of an information processing system according to an embodiment of the present invention.

Firstly, the outline of the whole of the present embodiment will be shown by use of FIG. 1.

In FIG. 1, reference numerals 1, 2, 3 and 4 denote instruction processors 0 to 3. Details of the processors 1 to 3 are not shown since they are the same as the processor 0. Numeral 5 denotes a storage control unit and numeral 6 denotes a main storage.

The storage control unit 5 controls access to the main storage 6. The processors 0 to 3 can perform through the storage control unit 5 the loading of data from the main storage 6 and the storing of data to the main storage 6.

In the processor 0, reference numeral 100 denotes a CW instruction execution unit, numeral 113 a group of general purpose registers, numeral 126 an internal time limit register for supervisor, numeral 131 a time limit register for user, and numeral 150 a busy wait timer. Numeral 200 denotes a CW instruction execution control unit and numeral 210 denotes a CW instruction execution enable flag. Numeral 300 denotes a CW instruction end judgement circuit and numeral 320 denotes a condition code. Numeral 400 denotes an interruption control unit, numeral 500 denotes an instruction decoder and 700 denotes a buffer storage.

In FIG. 1, the instruction decoder 500 reads an instruction from the main storage 6 through the storage control unit 5 or from the buffer storage. In the case where the read instruction is a CW instruction, the instruction decoder 500 sends a CW instruction detection signal "1" to the CW instruction execution control unit 200 through a line 506. The instruction decoder 500 also sends general purpose register numbers R1 and R2 designated by the R1 and R2 fields of the instruction to the CW instruction execution unit 100 through lines 504 and 505.

In the case where the content of the CW instruction execution enable flag 210 is "0", the CW instruction execution control unit 200 sends a special operation exception request signal "1" to the interruption control unit 400 through a line 214. The interruption control unit 400 generates an interruption caused by a special operation exception. On the other hand, in the case where the content of the CW instruction execution enable flag 210 is "1", the CW instruction execution control unit 200 performs four processings (1) to (4) as follow. (1) The control unit 200 sends a CW instruction execution control signal to the CW instruction execution unit 100 through a line 222 to control the execution of the CW instruction. (2) The control unit 200 sends a CW instruction start signal "1" to the CW instruction execution unit 100 through a line 232 so that the content of the (R1+1)th general purpose register designated by the R1 field of the CW instruction is copied into the time limit register 131 for user. (3) The control unit 200 sends a busy wait timer update signal "1" to the CW instruction execution unit 100 through a line 241 to start a processing for count-up of the busy wait timer 150. (4) The control unit 200 sends a time limit register update signal "1" to the CW instruction execution unit 100 through a line 234 to start a processing for count-down of the internal time limit register 126 for supervisor and the time limit register 131 for user.

The CW instruction execution unit 100 compares the content of the R1-th general purpose register 113 designated by the R1 field of the instruction and the content of the main storage at its address designated by the content of the R2-th general purpose register designated by the R2 field of the instruction. When both the contents become unequal to each other, the CW instruction execution unit 100 sends a synchronization signal "1" to the CW instruction and judgement circuit 300 through a line 119 and loads the content of the main storage 6 at its address designated by the content of the R2-th general purpose register 113 designated by the R2 field of the instruction into the R1-th general purpose register 113 designated by the R1 field of the instruction. Also, the CW instruction execution unit 100 sends a time limit expiration signal "1" (for supervisor) to the CW instruction end judgement circuit 300 through a line 129 when the content of the internal time limit register 126 for supervisor becomes equal to or smaller than 0 and sends a time limit expiration signal "1" (for user) to the CW instruction end judgement circuit 300 through a line 139 when the content of the time limit register 131 for user becomes equal to or smaller than 0.

(1) In the case where the line 119 (or the synchronization signal) and the lines 129 and 139 (or the time limit expiration signals) are all "0", the CW instruction end judgement circuit 300 sends a re-compare request signal "1" to the CW instruction execution control unit 200 through a line 342. The CW instruction execution control unit 200 sends a CW instruction execution control signal to the CW instruction execution unit 100 through the line 222 to instruct the execution unit 100 again to repeat a processing for comparison of the content of the R1-th general purpose register 113 designated by the R1 field of the CW instruction and the content of the main storage 6 at its address designated by the content of the R2-th general purpose register 113 designated by the R2 field of the CW instruction. Namely, a busy wait is taken.

(2) In the case where the line 119 (or the synchronization signal) is "1", the CW instruction end judgement circuit 300 sets "0" to the condition code 320 and sends a condition code setting end signal "1" to the CW instruction execution control unit 200 through a line 331. Also, in the case where the line 139 or the time limit expiration signal (for user) is "1", the CW instruction end judgement circuit 300 sets "2" to the condition code 320 and sends a condition code setting end signal "1" to the CW instruction execution control unit 200 through the line 331. Upon reception of the condition code setting end signal "1" through the line 331, the CW instruction execution control unit 200 changes the line 241 (or the busy wait time update signal) from "1" to "0" to stop the processings for update of the busy wait timer and the time limit registers. Also, the CW instruction execution control unit 200 sends a CW instruction end signal to the CW instruction execution unit 100 through a line 233 to copy the content of the time limit register 131 for user into the (R1+1)th general purpose register designated by the R1 field of the instruction.

(3) In the case where the line 129 or the time limit expiration signal for supervisor is "1", the CW instruction end judgement circuit 300 sends a CW interruption request signal "1" to the interruption control unit 400 through a line 353. The interruption control unit 400 generates a CW interruption.

The interruption control unit 400 generates an input/output interruption or an external interruption when an input/output interruption signal through a line 422 or an external interruption signal through a line 423 is received during the execution of the CW instruction. Upon generation of the input/output interruption or the external interruption, the interruption control unit 400 sends an interruption generation signal "1" to the CW instruction execution control unit 200 through a line 411. Upon reception of the interruption generation signal, the CW instruction execution control unit 200 changes the line 241 (or the busy wait timer update signal) and the line 234 (or the time limit register update signal) from "1" to "0" to stop the processings for update of the busy wait timer and the time limit registers. Also, the CW instruction execution control unit 200 sends a CW instruction end signal to the Cw instruction execution unit 100 through the line 233 to copy the content of the time limit register 131 for user into the (R1+1)th general purpose register 113 designated by the R1 field of the instruction.

In this manner, synchronization between processors can be accomplished by the time-limited busy wait and the busy wait time can be measured.

(3-b) Detailed Description

Next, the details of the information processing system as the embodiment of the present invention for realizing the CW instruction will be explained by use of FIGS. 2A to 2C.

FIG. 2B shows the details of the instruction decoder 500 and the CW instruction execution control unit 200 shown in FIG. 1. In FIG. 2B, reference numeral 5 denotes a storage control unit, numeral 6 a main storage, numeral 200 a CW instruction execution control unit and numeral 500 an instruction decoder.

In the instruction decoder 500, reference numeral 501 denotes an operation code of an instruction, numerals 502 and 503 R1 and R2 fields of the instruction, and numeral 506 a CW instruction detection signal. The instruction decoder 500 fetches an instruction from the main storage 6 through the storage control unit 5. In the case where the operation code 501 of an instruction is a CW instruction which is an embodiment of the present invention, the instruction decoder 500 sends a CW instruction detection signal "1" to the CW instruction execution control unit 200 through the line 506. Further, the instruction decoder 500 sends general purpose register numerals designated by the R1 and R2 fields 502 and 503 of the CW instruction onto lines 504 and 505.

In the CW instruction execution control unit 200, reference numeral 210 denotes a CW instruction execution enable flag, numeral 211 a NOT gate, numerals 212 and 213 AND gates, numeral 220 a control circuit, numeral 221 an OR gate, numeral 230 a CW instruction in-execution (or during-execution) indication flag, and numeral 231 an OR gate.

The CW instruction execution enable flag 210 is a one-bit register and represents whether or not the authority to execute the CW instruction is give. The case where the value of the CW instruction execution enable flag 210 is "1" indicates that the execution of the CW instruction is authorized, and the case where it is "0" indicates that the execution of the CW instruction is not authorized. A supervisor can load a value of "0" or "1" from the main storage 6 into the CW instruction execution enable flag 210 through a line 215 and can store the content of the CW instruction execution enable flag 210 into the main storage 6 through a line 216. Thus, by virtue of the CW instruction execution flag, the supervisor can restrict users who can use CW instructions.

Explanation will be made of the case where the CW instruction detection signal "1" comes from the instruction decoder 500 through the line 506 when the CW instruction execution enable flag 210 is "0". Since the CW instruction execution enable flag 210 is "0", an input of the NOT gate 211 is "0" and hence an output of the NOT gate 211 takes "1". Since the output of the NOT gate 211 and the line 506 (or the CW instruction detection signal) are both "1" two inputs of the AND gate 212 are both "1" and hence an output of the AND gate 212 or a line 214 takes "1" which is in turn delivered as a special operation exception request signal "1". The special operation exception request signal is sent to the interruption control unit 400 which in turn generates a special operation exception so that the execution of the CW instruction is suppressed.

Next, explanation will be made of the case where the CW instruction detection signal "1" comes from the instruction decoder 500 through the line 506 when the CW instruction execution enable flag 210 is "1". Since the CW instruction execution enable flag 210 and the line 506 (or the CW instruction detection signal) are both "1", two inputs of the AND gate 213 are both "1" and hence an output of the AND gate 213 or a line 232 takes "1". When the line 232 becomes "1", an output of the OR gate 221 takes "1" which is in turn sent to the control circuit 220. Upon reception of "1" from the OR circuit 221, the control circuit 220 sends a CW instruction execution control signal to the CW instruction execution unit 100 through a line 222 to control the execution of the processing of steps 920, 925, 930 and 935 in the flow chart of FIG. 3B which shows the procedure for the CW instruction. Also, the CW instruction in-execution indication flag 230, which is a one-bit register, is set to "1" when the line 232 (or a set signal) becomes "1" and is reset to "0" when a line 233 (or a reset signal) becomes "1". Accordingly, when the line 232 becomes "1", the CW instruction in-execution indication flag 230 is set to "1" and hence a line 241 (or a busy wait timer update signal) and a line 234 (or a time limit register update signal) take "1". The busy wait timer update signal and the time limit register update signal are sent to the CW instruction execution unit 100 through the lines 241 and 234 respectively so that a processing for count-up of the busy wait timer 150 and a processing for count-down of the time limit registers 126 and 131 are started. Also, a CW instruction start signal "1" is sent to the CW instruction execution unit 100 through the line 232.

Figure 2A:
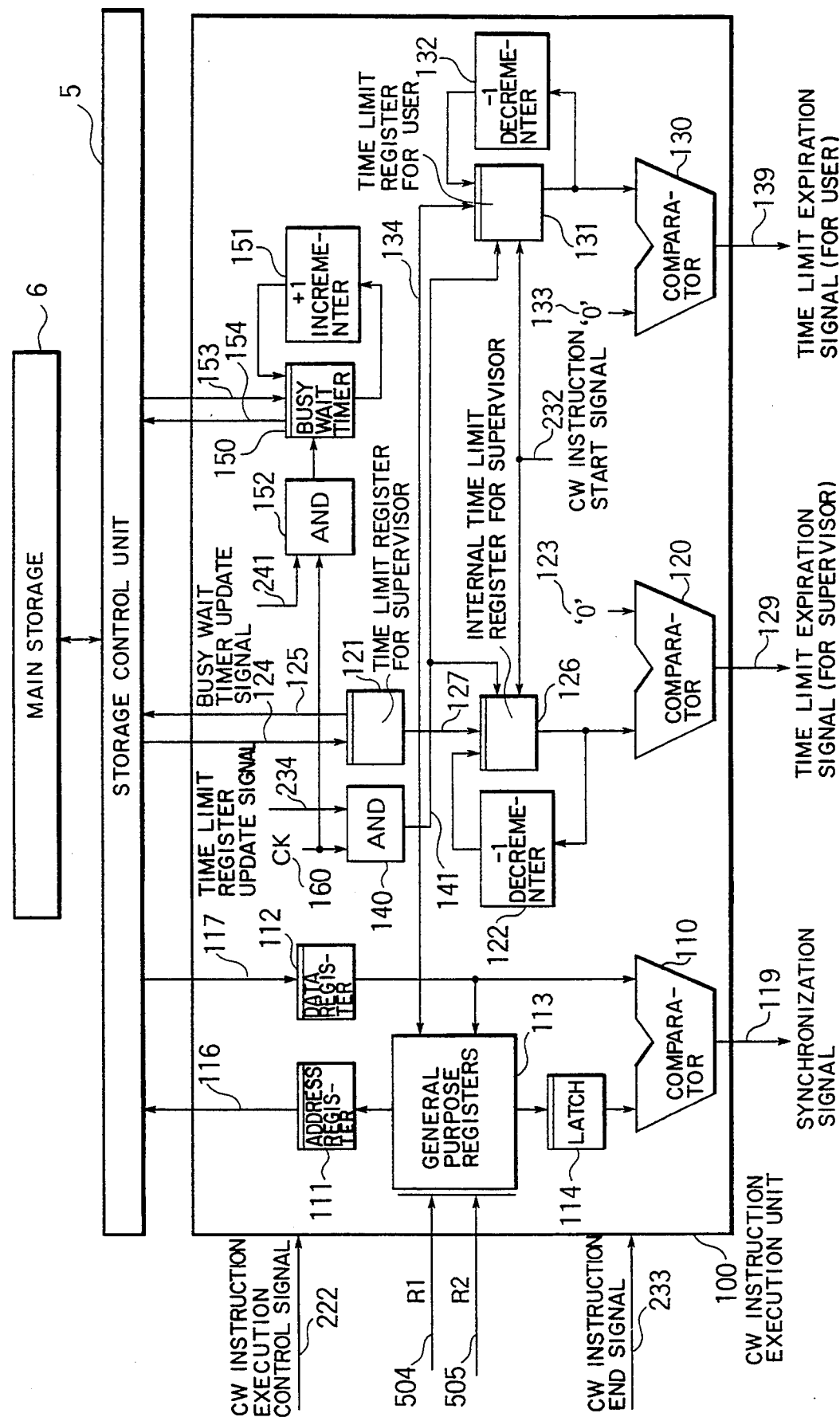
FIGS. 2A to 2C are circuit diagrams showing the details of the information processing system shown in FIG. 1.
Figure 2:
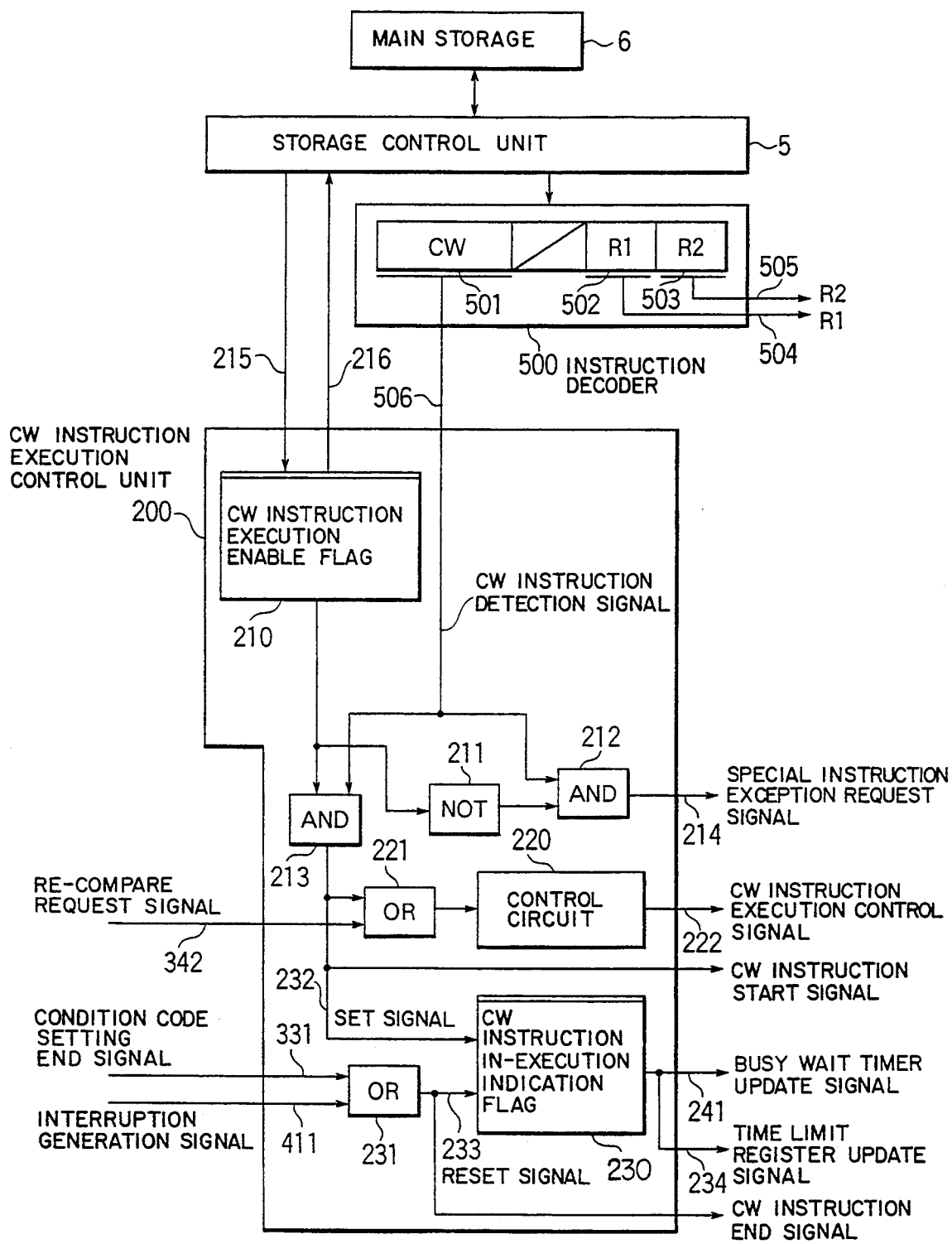

FIG. 2A shows the details of the CW instruction execution unit 100 shown in FIG. 1. In FIG. 2A, reference numeral 5 denotes a storage control unit, numeral 6 a main storage, and numeral 100 a CW instruction execution unit.

In the CW instruction execution unit 100, reference numeral 110 denotes a comparator, numeral 111 an address register, numeral 112 a data register, numeral 113 general purpose registers, numeral 114 a latch, numeral 120 a comparator, numeral 121 a time limit register for supervisor, numeral 122 a decrementer, numeral 123 a constant "0", numeral 126 an internal time limit register for supervisor, numeral 130 a comparator, numeral 131 a time limit register for user, numeral 132 a decrementer, numeral 133 a constant "0", and numeral 140 an AND gate. Numeral 150 denotes a busy wait timer, numeral 151 an incrementer, and numeral 152 an AND gate. Numeral 160 denotes a clock signal (CK) which is synchronous with fundamental clocks of the processing system.

The AND gate 140 outputs the clock signal 160 onto a line 141 during a time when a line 234 (or a time limit register update signal) is "1". The line 141 is a set signal for the internal time limit register 126 for supervisor and the time limit register 131 for user, and the updating of the contents of the internal time limit register 126 for supervisor and the time limit register 131 for user is continued during the time when the line 234 (or the time limit register update signal) is "1".

The AND gate 152 outputs the clock signal 160 during a time when a line 241 (or a busy wait timer update signal) is "1". Since the output of the AND gate 152 is a set signal for the busy wait timer 150, the updating of the content of the busy wait timer 150 is continued during the time when the line 241 (or the busy wait timer update signal) is "1".

The time limit register 121 for supervisor is a register which permits the supervisor to set therein an upper limit value for the execution time of a CW instruction of once, that is, the upper limit value of a busy wait time is set. The time limit register 121 for supervisor is used to prevent the system throughput from being deteriorated in the case where the busy wait time becomes too long. The content of the main storage 6 can be set into the time limit register 121 for supervisor through a line 124 and the content of the time limit register 121 for supervisor can be stored through a line 125 for storage into the main storage.

When a CW instruction start signal "1" is sent to the internal time limit register 126 for supervisor through a line 232, the content of the time limit register 121 for supervisor is transferred through a line 127 to the internal time limit register 126 for supervisor and is set thereinto.

The content of the internal time limit register 126 for supervisor is decremented by one in the decrementer 122 and is set again into the internal time limit register 126 in synchronism with the clock signal 160 in the case where the line 234 (or the time limit register update signal) is "1". Accordingly, during a time when the line 234 (or the time limit register update signal) is "1", the content of the internal time limit register 126 for supervisor is decremented one by one in synchronism with the clock signal 160. The comparator 120 compares the content of the internal time limit register 126 for supervisor and the constant "0". When the content of the internal time limit register 126 for supervisor becomes equal to or smaller than 0, the comparator 120 outputs on a line 129 a time limit expiration signal "1" (for supervisor) which indicates that the upper limit value of the CW instruction execution time has been reached.

The time limit register 131 for user is a register which permits a user to set therein an upper limit value for the execution time of a CW instruction of once, that is, the upper limit value of a busy wait time. The time limit register 131 for user is used to prevent the busy wait time from becoming too long. The time limit register 131 for user and the general purpose registers 113 can transfer their contents from one to another through a line 134. When the CW instruction start signal "1" is sent to the time limit register 131 for user through the line 232, the content of the general purpose register 113 of the (R1+1)th which is a register numeral (R1) designated by a line 504 plus one (1), is transferred through the line 134 to the time limit register 131 for user and is set thereinto.

The content of the time limit register 131 for user is decremented by one in the decrementer 132 and is set again set into the time limit register 131 for user in synchronism with the clock signal 160 in the case where the line 234 (or the time limit register update signal) is "1". Accordingly, during a time when the line 234 (or the time limit register update signal) is "1", the content of the time limit register 131 for user is decremented one by one in synchronism with the clock signal 160. The comparator 130 compares the content of the time limit register 131 for user with the constant "0". When the content of the time limit register 131 for user becomes equal to or smaller than 0, the comparator 130 outputs onto a line 139 a time limit expiration signal "1" (for user) which indicates that the upper limit value of the CW instruction execution time has been reached.

The busy wait timer 150 is a timer for measuring the CW instruction execution time and is used to measure a busy wait time required for synchronization between processors. The supervisor can set the content of the main storage 6 into the busy wait timer 150 through a line 153 and can store the content of the busy wait timer 150 through a line 154 into the main storage 6.

The content of the busy wait timer 150 is incremented by one in the incrementer 151 and is set again into the busy wait timer 150 in synchronism with the clock signal 160 in the case where the line 241 (or the busy wait timer update signal) is "1". Accordingly, during a time when the line 241 (or the busy wait timer update signal) is "1", the content of the busy wait timer 150 is incremented by one in synchronism with the clock signal 160.

In accordance with a control by a CW instruction execution control'signal (on a line 222), there are compared the content of the main storage 6 at its address designated by the content of a register in the general purpose registers 113 the register number of which is designated by the R2 field of the CW instruction and the content of a register in the general purpose register group 113 the register number of which is designated by the R1 field of the CW instruction. The content of a register in the general purpose registers 113 designated by a line 505 is read from the register to the address register 111. The content of the address register 111 is sent to the storage control unit 5 through a line 116 and the content of the main storage 6 at its address designated by the content of the address register 111 is fetched from the main storage 6 to the data register 112 through a line 117. Also, the content of a register in the general purpose registers 113 designated by the line 504 is read from the register to the latch 114. The comparator 110 compares the content of the latch 114 and the content of the data register 112. In the case where both the contents are not equal to each other, the comparator 110 sends out through a line 119 a synchronization signal "1" which indicates that synchronization between processors has been accomplished. Further, the content of the data register 112 is loaded into the R1-th general purpose register 113 designated by the R1 field of the instruction.

FIG. 2C shows the details of the CW instruction end judgement circuit 300 and the interruption control unit 400 shown in FIG. 1.

In the CW instruction end judgement circuit 300, reference numeral 310 denotes a selector, numeral 311 a constant "0", numeral 312 a constant "2", numeral 320 a condition code, numeral 322 a branch instruction execution control circuit, numeral 330 an OR gate, numeral 340 a NOR gate, numerals 341 and 350 AND gates, and numerals 351 and 352 NOT gates.

In the interruption control unit 400, reference numeral 410 denotes an interruption generation circuit, numeral 420 an input/output interruption request hold register, numeral 421 an external interruption request hold register, and numeral 424 a NOR gate.

In the CW instruction end judgement circuit 300, a line 119 serves as a selection signal for the selector 310. The selector 310 selects the constant "2" when the line 119 is "0" and the constant "0" when the line 119 is "1". The output of the selector 310 is set to the condition code 320 when the output of the OR gate 330 becomes "1".

(a) Explanation will be made of the case where the synchronization signal "1" comes from the CW instruction execution unit 100 through the line 119. When the line 119 (or the synchronization signal) becomes "1", the selector 310 selects the constant "0" and hence the output of the selector 310 takes "0". At this time, the output of the OR gate 330 becomes "1" since one input thereof connected to the line 119 (or the synchronization signal) is "1". Accordingly, "0" is set to the condition code 320. Since a line 331 which is the output of the OR gate 330 takes "1", a condition code setting end signal "1" is sent to the CW instruction execution control unit 200. Thus, the execution of the CW instruction is completed with the condition code being set to "0".

(b) Next, explanation will be made of the case where "0" comes from the CW instruction execution unit 100 through the line 119 (for the synchronization signal) and a time limit expiration signal "1" (for user) comes from the CW instruction execution unit 100 through a line 139. Since the line 119 becomes "0", the selector 310 selects the constant "2" and hence the output of the selector 310 takes "2". On the other hand, since the line 139 or the time limit expiration signal (for user) which is one input of the OR gate 330 takes "1", the output of the OR gate 330 becomes "1". Accordingly, "2" is set to the condition code 320. Since the line 331 which is the output of the OR gate 330 takes "1", a condition code setting end signal "1" is sent to the CW instruction execution control unit 200. Thus, the execution of the CW instruction is completed with the condition code being set to "2".

The condition code 320 is sent through a line 321 to the branch instruction execution control circuit 322 which judges the condition of a branch instruction. Accordingly, programming can be made in which a processing succeeding the CW instruction differs in accordance with the condition code. Since the branch instruction execution control circuit 322 is known, explanation of the details thereof will be omitted. One example of the programming is as follows. The case where the condition code is "0" means that a synchronization processing has normally been finished. In such a case, therefore, an instruction sequence succeeding the synchronization processing is executed. On the other hand, the case where the condition code is "2" means that a synchronization processing based on a busy wait has reached a time limit. In such a case, therefore, a supervisor interruption request is generated (for example, a WAIT macro is executed) and a synchronization processing with the intervention of an OS is performed, thereby contemplating the effective utilization of the processing system. Namely, the effective utilization of the processing system is contemplated by allowing the OS to dispatch another task.

(c) Explanation will be made of the case where "0" comes from the CW instruction execution unit 100 through the line 119 (for the synchronization signal) and the line 139 (for the time limit expiration signal (for user)) and a time limit expiration signal "1" (for supervisor) comes from the CW instruction execution unit 100 through a line 129. Since the line 119 and the line 139 are both "0" or two inputs of the OR gate 330 are both "0", the output of the OR gate 330 takes "0" and hence the line 331 (for the condition code setting end signal) is "0". On the other hand, the output of the NOT gate 352 takes "1" since the line 119 is "0", and the output of the NOT gate 351 also takes "1" since the line 139 is "0". Accordingly, three inputs of the AND gate 350, that is, the output of the NOT gate 351, the output of the NOT gate 352 and the line 129 (or the time limit expiration signal (for supervisor)) are both "1". Therefore, the output of the AND gate 350 takes "1" which is in turn sent as a CW interruption request signal "1" to the interruption control unit 400 through a line 353. A CW interruption is generated in the interruption control unit 400, thereby completing the execution of the CW instruction.

(d) Next, explanation will be made of the case where "0" comes from the CW instruction execution unit 100 through all the line 119 (for the synchronization signal), the line 139 (for the time limit expiration signal (for user)) and the line 129 (for the time limit expiration signal (for supervisor)).

If an input/output interruption request is issued when the CW instruction is being executed, an input/output interruption signal is supplied through a line 422 to the interruption control unit 400 so that "1" is set to the input/output interruption request hold register 420. On the other hand, if an external interruption request is issued when the CW instruction is being executed, an external interruption signal is supplied through a line 423 so that "1" is set to the external interruption request hold register 421.

(d1) Firstly, the explanation will be made of the case where the input/output interruption request hold register 420 and the external interruption request hold register 421 are both "0". In this case, since two inputs of the NOR gate 424 are both "0", the output of the NOR gate 424 takes "1". On the other hand, in the CW instruction end judgement circuit 300, since three inputs of the NOR gate 340 or the lines 119, 129 and 139 are all "0", the output of the NOR gate 340 takes "1". Since two inputs of the AND gate 341 or the output of the NOR gate 340 and the output of the NOR gate 424 are both "1", the output of the AND gate 341 takes "1" which is in turn sent as a re-compare request signal "1" to the CW instruction execution control unit 200 through a line 342. The CW instruction execution control unit 200 controls the CW instruction execution unit 100 again so that the comparison processing as mentioned above is repeated. Namely, a busy wait is taken.

(d2) In the case where either the input/output interruption request hold register 420 or the external interruption request hold register 421 is "1", the output of the NOR gate 424 takes "0". In this case, since one input of the AND gate 341 or the output of the NOR gate 424 is "0", the output of the AND gate 341 takes "0". Namely, the line 342 remains "0" and hence no re-compare request signal is delivered. On the other hand, the interruption generation circuit 410 generates the held input/output interruption or external interruption. Thus, the execution of the CW instruction is completed.

In the interruption control unit 400, the interruption generation circuit 410 generates a special operation exception interruption when a special operation exception request signal is received through a line 214. Upon reception of the CW interruption request signal through the line 353, the interruption generation circuit 410 generates a CW interruption with the type of ending of the CW instruction being nullified. Upon reception of a signal through the input/output interruption factor hold register 420, the interruption generation circuit 410 generates an input/output interruption and resets the input/output interruption request hold register 420 to "0". Upon reception of a signal through the external interruption request hold register 421, the interruption generation circuit 410 generates an external interruption and resets the external interruption request hold register 421 to "0". When generating an interruption, the interruption generation circuit 410 sends an interruption generation signal "1" to the CW instruction execution control unit 200 through a line 411.

Again referring to FIG. 2B, explanation will be made of the operation of the CW instruction execution control unit 200 after signals are received from the CW instruction end judgement circuit 300 and the interruption control unit 400.

Firstly, explanation will be made of the operation in the case where the re-compare request signal "1" comes from the CW instruction end judgement circuit 300 through the line 342. When the line 342 becomes "1", one input of the OR gate 221 takes "1" and hence the output of the OR gate 221 takes "1" which is in turn inputted to the control circuit 220. Upon reception of "1", the control circuit 220 sends the CW instruction execution control signal to the CW instruction execution unit 100 through the line 222, in a manner similar to that mentioned before, so that the operation having been mentioned in detail is repeated again.

Next, explanation will be made of the case where the condition code setting end signal "1" comes through the line 331 or the case where the interruption generation signal "1" comes through the line 411. When the line 331 (or the condition code setting end signal) or the line 411 (or the interruption generation signal) becomes "1", the output of the OR gate 231 takes "1" and hence the line 233 (or the reset signal) takes "1". When the line 233 becomes "1", the CW instruction in-execution indication flag 230 is reset from "1" to "0" so that the line 241 (or the busy wait timer update signal) and the line 234 (or the time limit register update signal) become "0". When the signals become "0", the processing for count-up of the busy wait timer 150 and the processing for count-down of the internal time limit register 126 for supervisor and the time limit register 131 for user are stopped. Also, a CW instruction end signal "1" is sent to the CW instruction execution unit 100 through the line 233. Thereafter, the execution of the CW instruction is completed.

Again referring to FIG. 2A, explanation will be made of the operation of the CW instruction execution unit 100 when the CW instruction end signal "1" comes through the line 233.

In the case where the CW instruction end signal "1" is received from the CW instruction execution control unit 200 through the line 233, the processing for update of the time limit register 131 for user remains stopped since the line 234 (or the time limit register update signal) is "0". Upon reception of the CW instruction end signal "1", the CW instruction execution unit 100 copies through the line 134 the content of the time limit register 131 for user into the general purpose register 113 of the (R1+1)th which is (a register number sent through the line 504 and designated the R1 field of the instruction) plus (one), thereby completing the execution of the CW instruction. If the content of the (R1+1)th general purpose register is read after the completion of execution of the CW instruction, it is possible to known a busy wait time caused by this CW instruction.

According to the foregoing embodiment, since the maximum time for busy wait can be set by the time limit registers for user and for supervisor and synchronization not based on a busy wait but with the intervention of an OS can be accomplished in the case where the time limit has been reached, the OS can dispatch other task instead of a task under the busy wait and it is possible even under a multi-job environment to contemplate the effective utilization of the processing system, thereby preventing the deterioration of the job throughout. Also, since a busy wait time can be measured by the busy wait timer, it is possible to provide a stabilized account to a user by subtracting the measured busy wait time from the whole CPU time used by the job subjected to parallel processing.

(4) PROCESSING BY OS RELATED TO CW INSTRUCTION

By use of FIGS. 2A to 2C, 8 and FIGS. 9A to 9E will be made explanation of embodiments of a processing related to CW interruption, a processing related to creation/deletion of sub-tasks and a processing related to busy wait timer which are processings by an operating system (OS) to be newly added in a CW instruction which is an embodiment of the present invention. Explanation of known processings by the OS will be omitted.

Figure 8:
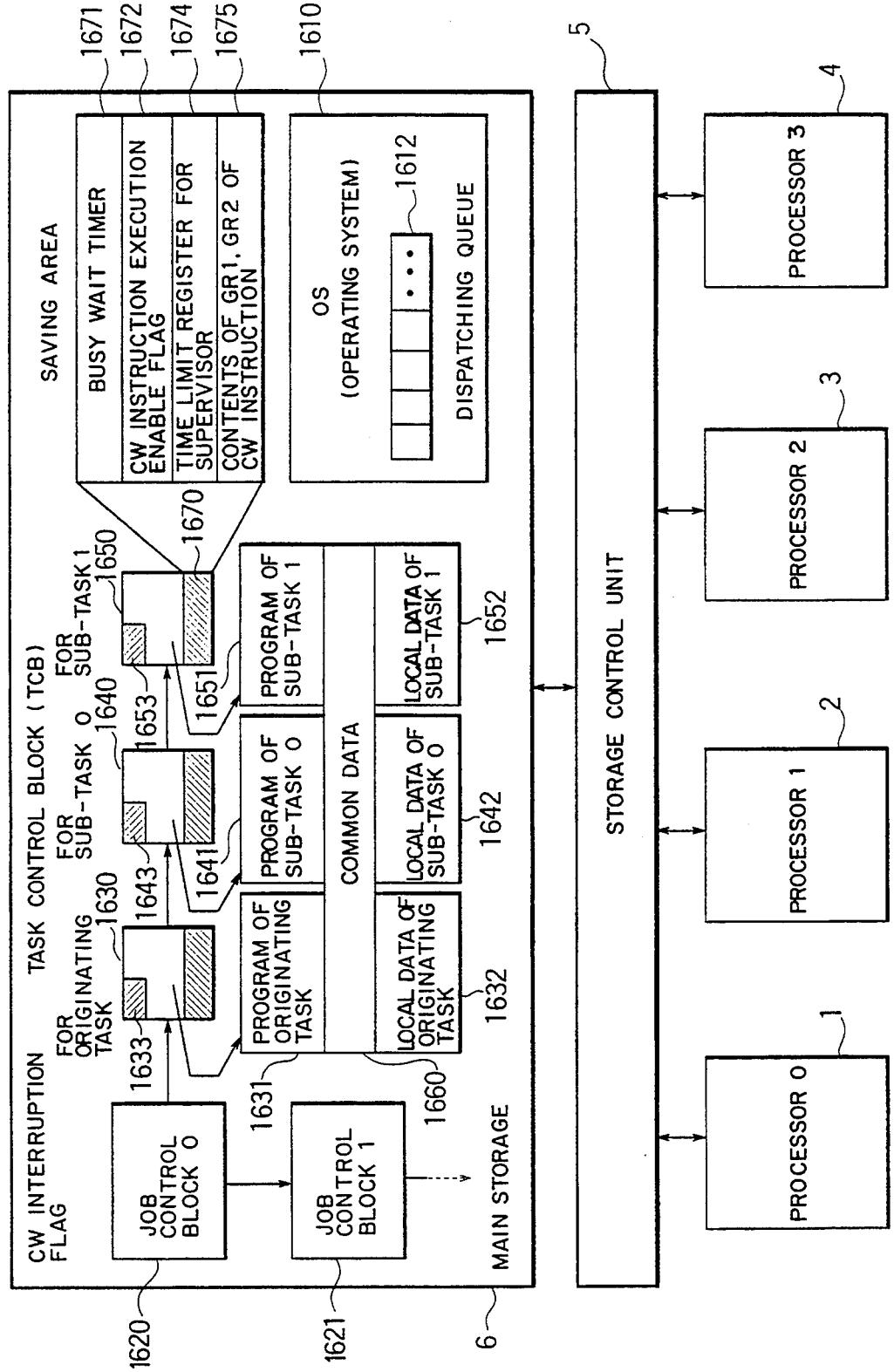
FIG. 8 is a block diagram for explaining data areas of an operating system (OS) related to a CW instruction according to the present invention.

In FIG. 8, reference numerals 1, 2, 3 and 4 denote instruction processors 0 to 3, numeral 5 a storage control unit, and numeral 6 a main storage.

In FIG. 8, reference numeral 1610 shows that an operating system (OS) is stored in the main storage. Numeral 1612 denotes a dispatching queue elements in each of which the address of the TCB (task control block) of dispatchable taks is stored. Numerals 1620 and 1621 denote job control blocks in which control information for each job is stored. One job control block is produced for one job. Numerals 1630, 1640 and 1650 denote task control blocks (hereinafter referred to as TCB) in which control information for each task including the base address of a program area of the task and a saving area of the task is stored. The block 1630 is a TCB for an originating task, the block 1640 a TCB for a sub-task 0, and the block a TCB for a sub-task 1. One TCB is produced for one task. In the case where multitasking is performed with one job being divided into a plurality of tasks, a plurality of TCB's 1630, 1640 and 1650 are produced for one job control block 1620. Numerals 1631, 1641 and 1651 denote program areas of the originating task, the sub-task 0 and the sub-task 1, numerals 1632, 1642 and 1652 local data areas or characteristic data areas of the originating task, the sub-task 0 and the sub-task 1, and numeral 1660 a common data area or a data area common to the originating task, the sub-task 0 and the sub-task 1. Data used for synchronization between tasks is placed in the common data area 1660. Numeral 1670 denotes a saving area of the task. The above is not different from the known processing by OS.

What is characteristic among the processings by the operating system (OS) to be newly added in a CW instruction which is an embodiment of the present invention, is as follows. Reference 1671 denotes a region for saving the busy wait timer 150. The total of busy wait times caused by CW instructions is stored in the busy wait time region 1671. Numeral 1672 denotes a region for saving the CW instruction execution enable flag 210, numeral 1674 a region for saving the time limit register 121 for supervisor, and numeral 1675 a region for saving the R1-th and R2-th general purpose registers 113 designated by the R1 and R2 fields of an CW instruction is respect to which a CW interruption is detected upon generation thereof. Numerals 1633, 1643 and 1653 denote CW interruption flags. The CW interruption flag is stored with "1" when a CW interruption is being generated and "0" when not so.

Figure 9:
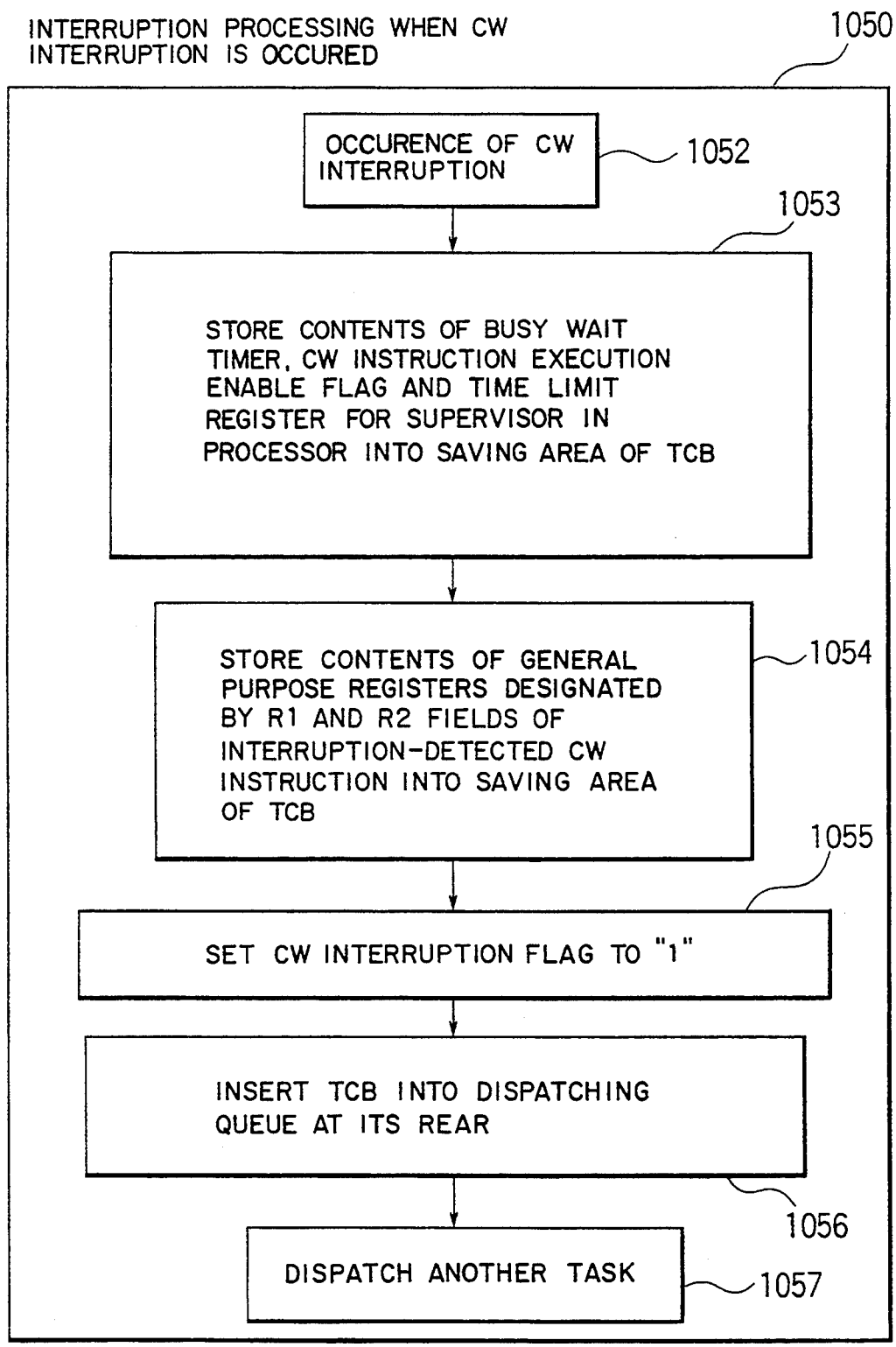
FIGS. 9A to 9E are the flow charts showing the procedure by an OS related to the CW instruction according to the present invention.
Figure 9:
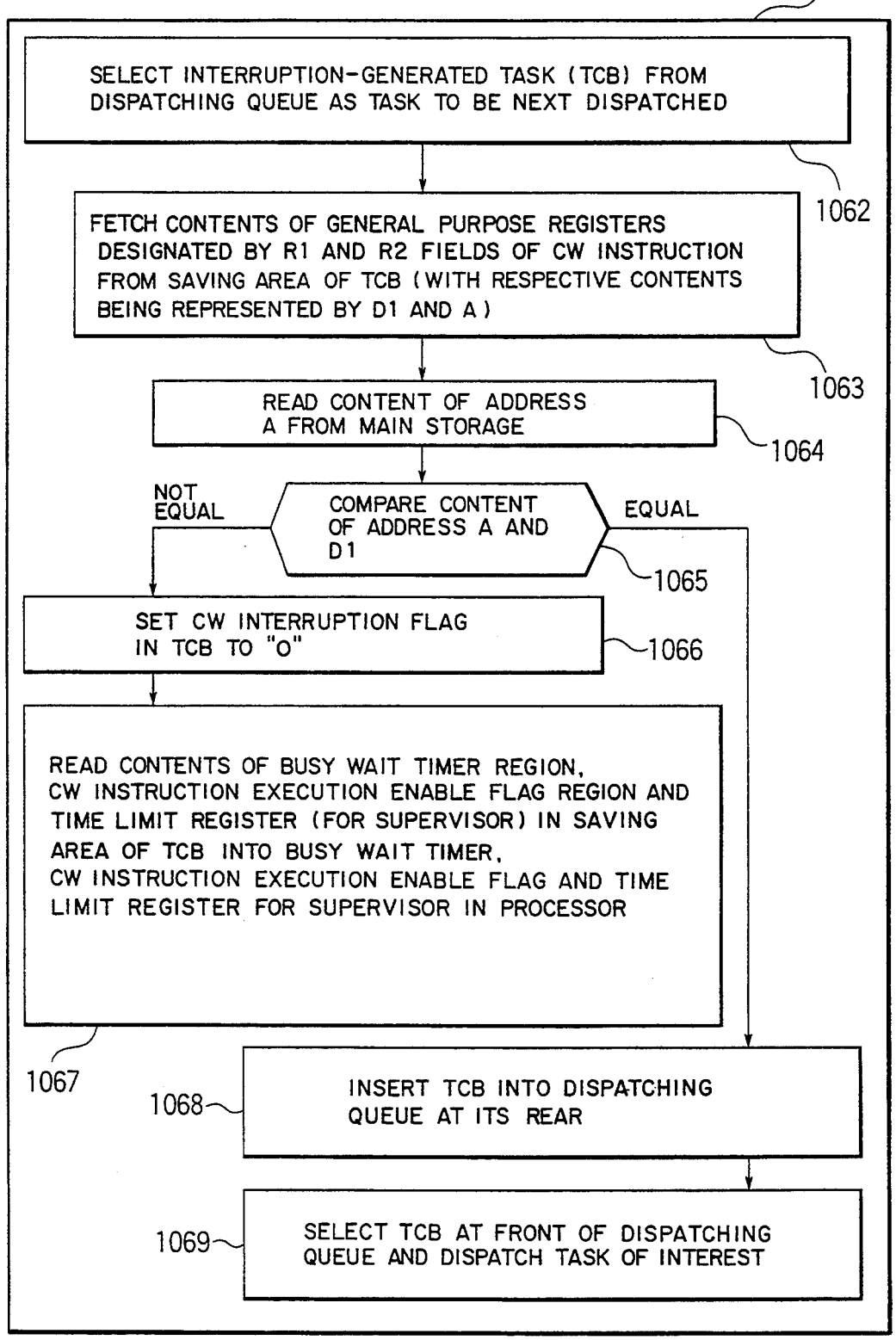
Figure 9:
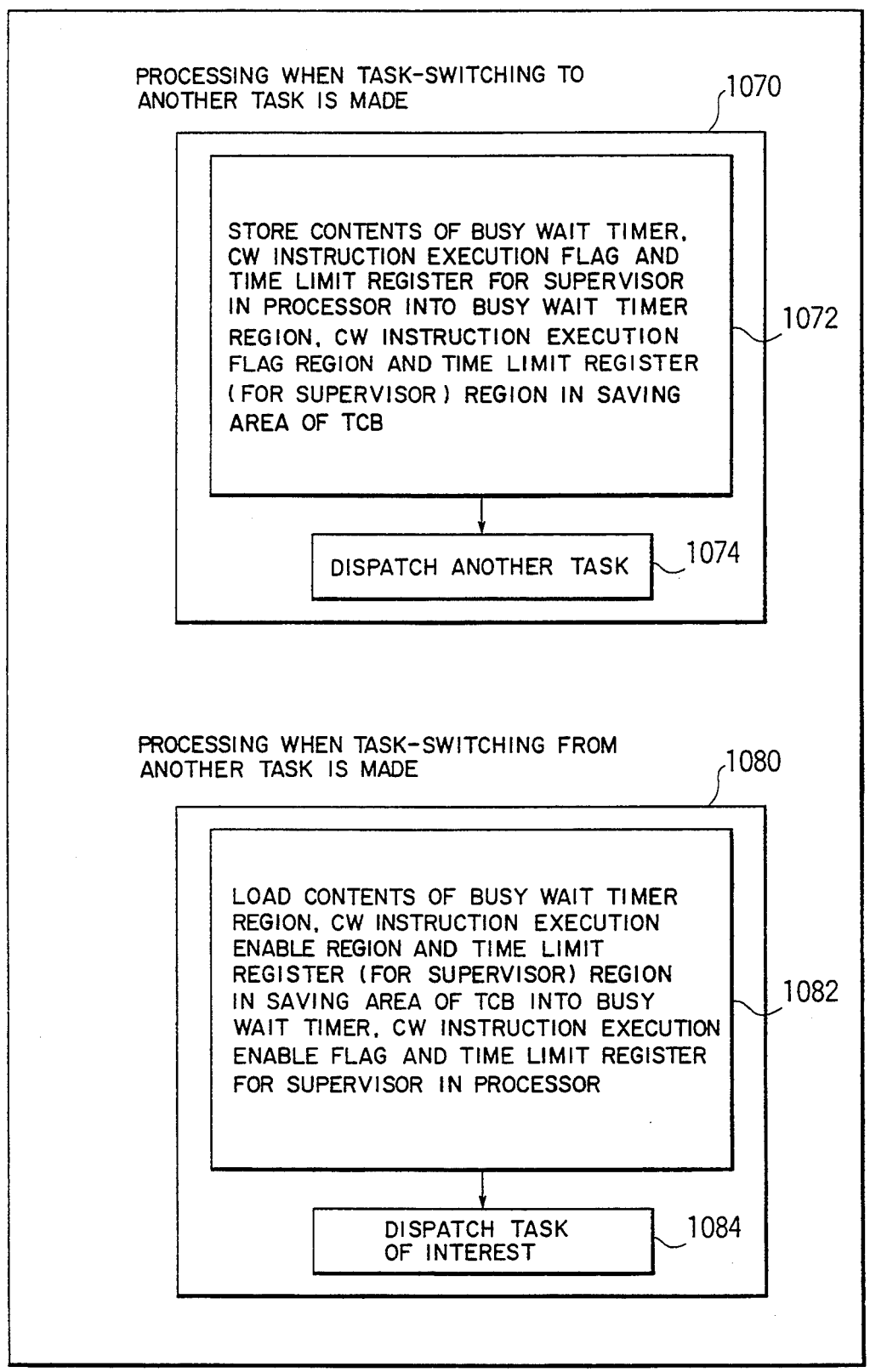
Figure 9:
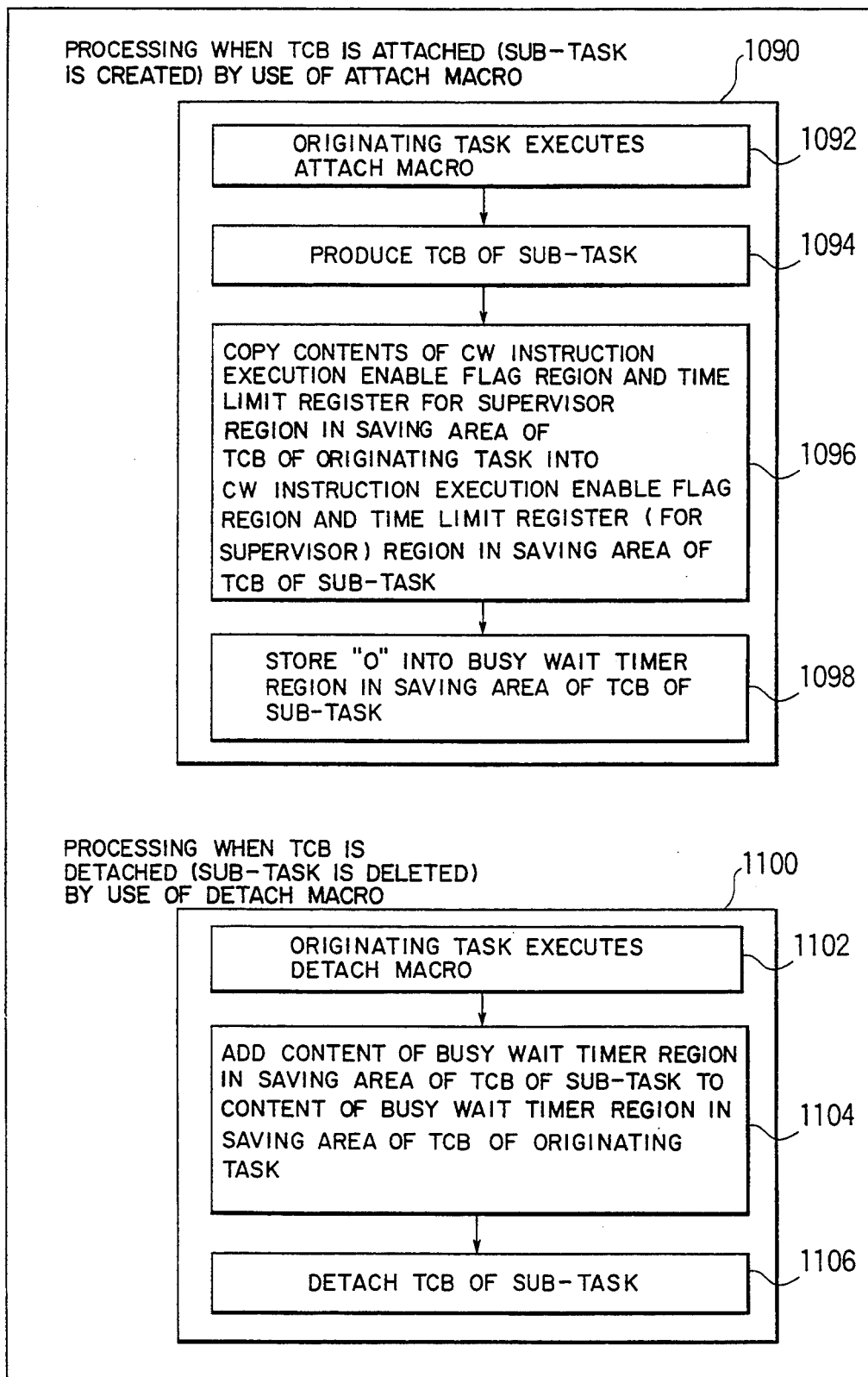

An embodiment of a processing by the OS related to a CW instruction will be explained in reference with a flow chart shown in FIG. 9A.

When a user submits a job subjected to parallel processing using CW instruction by JCL (job control language) (step 1012), the OS performs a set-up processing (1020) for initiation of the execution of the job. Firstly, the OS produces a job control block 1620 corresponding to the job and a task control block (TCB) 1630 for an originating task corresponding to the job (step 1021). Next, a time limit value is stored into a time limit register (for supervisor) region 1674 is a saving area of the TCB (step 1022). The OS selects the time limit value in accordance with the operating conditions of the system. Also, an initial value "0" of a busy wait time is stored into a busy wait timer region 1671 in the saving area of the TCB (step 1023) and "1" is stored into a CW instruction execution enable flag region 1672 in the saving area of the TCB in the case where multitasking can be performed for the job (step 1024). Finally, an address of the TCB is registered into the dispatching queue 1612 and the task waits for itself to be dispatched (step 1025).

When the task is to be dispatched to the processor 0, the contents of the busy wait timer region 1671, the CW instruction execution enable flag region 1672 and the time limit register (for supervisor) region 1674 in the saving area (1670) of the TCB are respectively loaded through the lines 153, 215 and 124 into the busy wait timer 150, the CW instruction execution enable flag 210 and the time limit register 121 for supervisor which are present in the processor 0 (step 1030).

A block 1040 shows a processing related to the CW instruction after the task has been dispatched. Reference numeral 1050 denotes an interruption processing when an CW interruption is occurred during the task of multitasking using the CW instruction, numeral 1060 a processing when the task registered in the dispatching queue 1612 due to the generation of a CW interruption is re-dispatched, numeral 1070 a processing in the case where task-switching from a task to be subjected to multitasking by use of a CW instruction to another task is made, numeral 1080 a processing in the case where task-switching to the task to be subjected to multitasking by use of a CW instruction from another task is made, numeral 1090 a processing in the case where a TCB (or sub-task) is attached or sub-task is created by use of an ATTACH macro, and numeral 1100 a processing in the case where a TCB is detached or sub-task is deleted by use of a DETACH macro.

The details of the processing 1090 in the case where a TCB is attached or sub-task is created by use of an ATTACH macro will be explained in reference with FIG. 9E.

Firstly, an originating task executes an ATTACH macro to request the OS to create sub-task (step 1092). The case where the creation of the sub-task 1 is requested will now be explained by use of FIGS. 8 and 9E. The OS produces a TCB (task control block) 1650 for the sub-task 1 for storing control information of the sub-task 1 (step 1094). Further, because of the same job, the content of a CW instruction execution enable flag region and a time limit register region for supervisor in a saving area of a TCB 1630 for an originating task are copied into a CW instruction execution enable flag region 1672 and a time limit register (for supervisor) region 1674 in a saving area 1670 of the TCB 1650 for the sub-task 1 (step 1096). Since the sub-task 1 is not yet executed, an initial value "0" is stored into a busy wait timer region 1671 in the saving area 1670 of the TCB 1650 of the sub-task 1 (step 1098). After the saving area 1670 of the TCB 1650 of the sub-task 1 has thus been initialized, an address of the TCB 1650 is registered into the dispatching queue 1612 of the OS. The sub-task 1 waits for itself to be dispatched.

The details of the processing 1070 in the case where the OS makes task-switching to another task will be explained in reference with FIG. 9D.

The OS saves the contents of the CW instruction execution enable flag 210 and the time limit register 121 for supervisor in the processor into a CW instruction execution enable flag region 1672 and a time limit register (for supervisor) region 1674 in a saving area of a TCB in the main storage 6 through the lines 216 and 125 respectively and saves the content of the busy wait timer 150 in the processor into a busy wait timer region in the saving area of the TCB in the main storage 6 through the line 154 to save the total of busy wait times until now (step 1072). Since the content of the time limit register 131 for user is copied upon end of a CW instruction into the general purpose register 113 designated by the CW instruction, the content of the time limit register 131 for user is saved into the main storage 6 through a saving processing for general purpose register which is the conventional or known processing by the OS. Thereafter, another task is dispatched (step 1074).

The details of the processing 1080 in the case where the OS makes task-switching from another task will be explained in reference with FIG. 9D.

After having saved the execution environment of another task into a saving area of a TCB in the main storage 6, the OS performs a processing necessary for dispatching the task which is to be subjected to multitasking by use of the CW instruction (hereinafter referred to as the task of interrupt). The OS loads the contents of a CW instruction execution enable flag region 1672 and a time limit register (for supervisor) region 1674 in a saving area of a TCB into the CW instruction execution enable flag 210 and the time limit register 121 for supervisor in a processor through the lines 215 and 124 respectively and loads the content of a busy wait timer region 1671 in the saving area of the TCB or the total of busy wait times until now into the busy wait timer 150 in the processor through the line 153 to accumulate the total of busy wait times from the start of execution of the task of interest (step 1082). Namely, since the OS saves the value of the busy wait timer 150 upon task-switching to another task, as mentioned in conjunction with the processing 1070, and reloads the saved value of the busy wait timer upon task-switching from the other task, it is possible to determine or obtain accumulated value of busy wait times required over a plurality of CW instructions. Since the content of the general purpose register 113 designated by a CW instruction is copied upon start of the execution of the CW instruction into the time limit register 131 for user, a necessary value is loaded into the time limit register 131 for user by performing a recovery processing for general purpose register which is a known processing by the OS. Thereafter, the task of interest is dispatched (step 1084).

The details of the interruption processing 1050 in the case where a CW interruption is occurred will be explained in reference with FIG. 9B.

The explanation will be made in conjunction with the case where the sub-task 1 is being executed by the processor 0 and a CW interruption is generated in the processor 0. When the CW interruption is generated (step 1052), the control is delivered to an interruption processing routine of the OS through the process of an interruption operation. The OS stores the contents of the busy wait timer 150, the CW instruction execution enable flag 210 and the time limit register 121 for supervisor in the processor 0 into a busy wait timer region 1671, a CW instruction execution enable flag region 1672 and a time limit register (for supervisor) region 1674 in a saving area 1670 of a TCB for the sub-task 1 through the lines 154, 216 and 125, respectively (step 1053). Further, the contents of the general purpose registers 113 designated by the R1 and R2 of a CW instruction in respect to which a CW interruption is detected, are stored into a region 1675 in the saving area 1670 of the TCB for saving the contents of the general purpose registers designated by the R1 and R2 fields of the CW instruction (step 1054). Also, a CW interruption flag 1653 in the TCB is set to "1" (step 1055), and a TCB address of a task in respect to which the CW interruption is detected in inserted into the dispatching queue 1612 at its rear (step 1056). The insertion at the rear of the dispatching queue is made for lowering the dispatching priority during a time when there waits for synchronization between tasks. Finally, another task is selected from the front of the dispatching queue 1612 and is dispatched (step 1057).

The details of the processing 1060 when a task registered in the dispatching queue 1612 due to the generation of a CW interruption is re-dispatched will be explained in reference with FIG. 9C.

The explanation will be made in conjunction with the case where the sub-task 1 is dispatched. When a task having "1" as a CW interruption flag 1653 of a TCB or a task registered in the dispatching queue 1612 due to the generation of a CW interruption (hereinafter referred to the task of interest) is selected from the dispatching queue 1612 as a task to be next dispatched (step 1062), the content of a region 1675 in a saving area 1670 of TCB for saving the contents of the general purpose registers designated by the R1 and R2 field of the CW instruction is firstly fetched and the contents of R1 and R2 are represented by D1 and A, respectively (step 1063). The content of the address A is fetched from the main storage 6 and the fetched data is represented by D2 (step 1064). The content of the data D1 and the content of the data D2 are compared (step 1065). The CW interruption was generated with the tape of ending of the CW instruction being nullified. Therefore, when the task of interest is dispatched, the execution will be started again from the CW instruction in regard to which the interruption was generated. If the data D1 and the data D2 are equal to each other, the task of interest is inserted again into the dispatching queue 1612 at its rear (step 1068) since even if this task is dispatched a CW interruption is occurred again because of the time limit expiration. And, another task is selected from the front of the dispatching queue 1612 and is dispatched (step 1069). On the other hand, if the data D1 and the data D2 are not equal to each other, the CW interruption flag 1653 in the TCB is reset to "0" (step 1066), and the contents of a busy wait timer region 1671, a CW instruction execution enable flag region 1672 and a time limit register (for supervisor) region 1674 in the saving area 1670 of the TCB are loaded into the busy wait timer 150, the CW instruction execution enable flag 210 and the time limit register 121 in the processor 0 (step 1067). In such a manner, the task of interest is re-dispatched. Since the OS saves the value of the busy wait timer 150 upon occurrence of the CW interruption, as mentioned in conjunction with the processing 1050, and reloads the value of the busy wait timer when the task registered in the dispatching queue due to the occurrence of the CW interruption is re-dispatched in the processing 1060, it is possible to determine an accumulated value of busy wait times when the CW instruction is executed plural times.

The details of the processing 1100 in the case where a TCB is detached or sub-task is deleted by use of a DETACH macro will be explained in reference with FIG. 9E.

Firstly, an originating task executes a DETACH macro to request the OS to delete a sub-task (step 1102). The case where the deletion of the sub-task 1 is requested will now be explained by use of FIGS. 8 and 9E. In order to report a busy wait time of the whole of a job to a user or system administrator, the OS needs to have the originating task take over a busy wait time of the sub-task 1 caused by a CW instruction. The OS adds the total of busy wait times of the sub-task 1 stored in a busy wait timer region 1671 is a saving area 1670 of a TCB 1650 of the sub-task 1 to the content of a busy wait timer region in a saving area of a TCB 1630 of the originating task (step 1104). Thereafter, the TCB 1650 of the sub-task 1 is detached through the conventional or known processing by the OS (step 1106).

Returning to FIG. 9A, upon end of a job, the contents of busy wait timer regions in the saving areas of TCB's for all tasks for this job present upon end of the job are summed and the total busy wait time is outputted as account information (step 1110). When each task comes an end and the control is returned to the OS, the OS stores the content of a busy wait timer in a processor into a busy wait timer region in the saving area of the TCB of each task (step 1110).

By adding the above-mentioned processing to the conventional OS, it becomes possible to accomplish synchronization between tasks by use of a CW instruction and determine a busy wait time as account information.

In the present embodiment, the content of data D1 and the content of data D2 are compared in step or processing 1065 (see FIG. 9C) and if the data D1 and the data D2 are equal to each other, the task of interest is inserted again into the dispatching queue 1612 at its rear and another task is dispatched. However, this processing can be omitted for the following reason. Namely, when a CW interruption is generated, the TCB of the task of interest is inserted into the dispatching queue at its rear to lower the dispatching priority of this task. Therefore, there is a high probability that a task sending a synchronization signal to the task of interest has already been dispatched and the synchronization signal has already been sent.

(5) OTHER EMBODIMENTS OF PRESENT INVENTION

Figure 4:
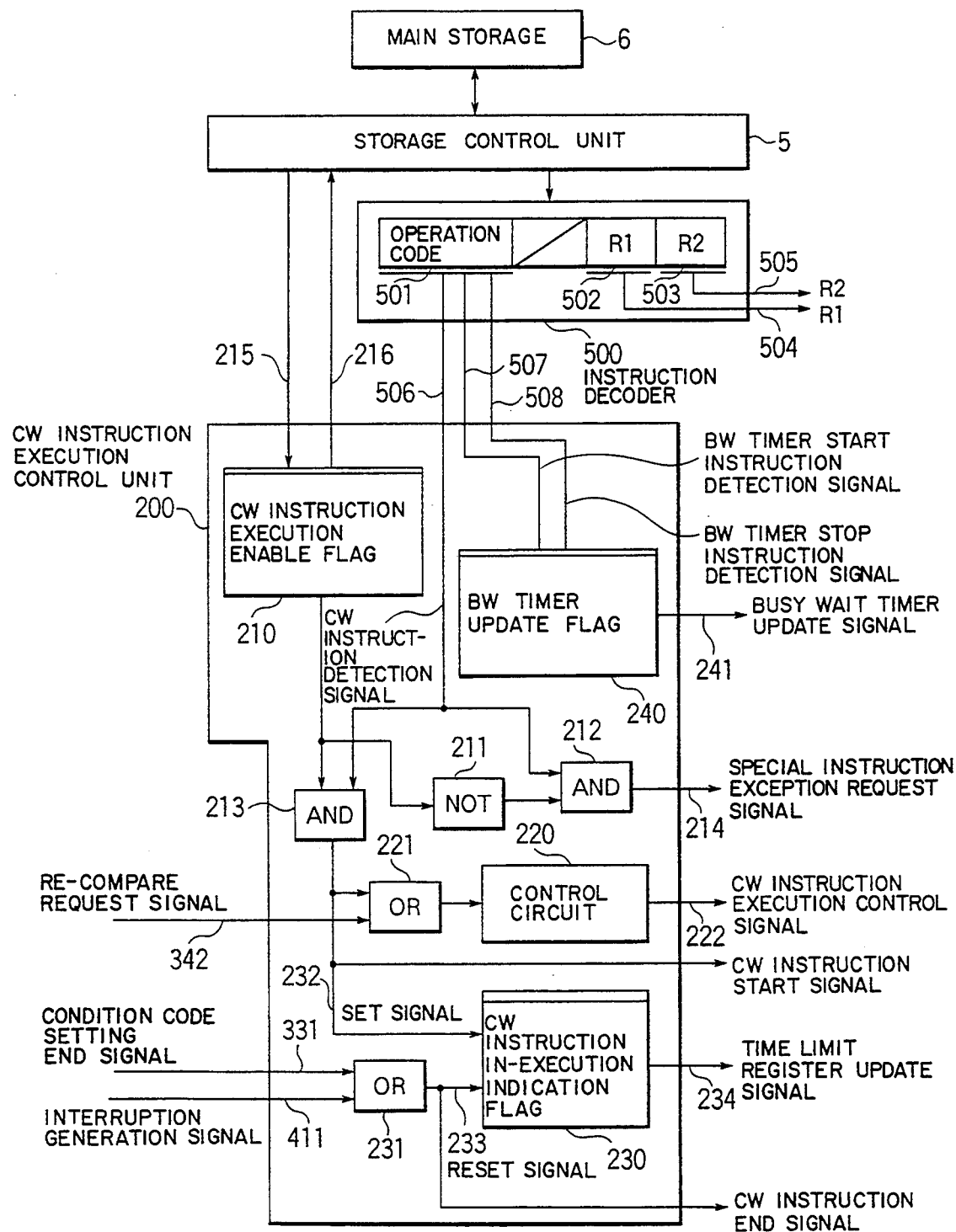
FIG. 4 is a circuit diagram showing the details of the CW instruction execution control unit in another embodiment of the present invention.

In the foregoing embodiment, the processing for update of the value of the busy wait timer has been performed during the execution of a CW instruction. However, as shown in FIG. 4, the processing for update of the busy wait timer can be controlled by providing an instruction which indicates the start of a processing for count-up of the busy wait timer and an instruction which indicates the stop of the processing for count-up of the busy wait timer. Namely, it is possible to measure a busy wait time by executing the instruction to indicate the processing for count-up of the busy wait timer immediately before a CW instruction and executing the instruction to indicate the stop of the processing for count-up of the busy wait timer after a synchronization processing based on a busy wait has been finished. In this case, however, since the control is made by not a supervisor but a user, a system administrator cannot utilize the busy wait time as account information though the user can utilize the busy wait time as turning information for a program or the like.

In FIG. 4, reference numeral 240 denotes a BW (busy wait) timer update flag and numeral 501 denotes an operation code field of an instruction. The other components are the same as those shown in FIG. 2B.

When detecting a BW time start instruction to start a processing for count-up of the busy wait timer, the instruction decoder 500 sends a BW timer start instruction detection signal "1" to the BW timer update flag 240 through a line 507. Upon reception of the BW timer start instruction detection signal "1", the BW timer update flag 240 is set to "1". When the BW timer update flag 240 becomes "1", a busy wait timer update signal "1" is sent out through a line 241 so that the processing for count-up to the busy wait timer is performed.

When detecting a BW timer stop instruction to stop the processing for count-up of the busy wait timer, the instruction decoder 500 sends a BW timer stop instruction detection signal "1" to the BW timer update flag 240 through a line 508. Upon reception of the BW timer stop instruction detection signal, the BW timer update flag 240 is reset to "0". When the BW timer update flag 240 is reset to "0", the line 241 (or the busy wait timer update signal) becomes "0" so that the processing for count-up of the busy wait timer is stopped.

In the case where a task which is executing a CW instruction is interrupted due to an input/output interruption or an external interruption, the OS needs to stop the processing for update of the busy wait timer. In this case, a CW flag indicating whether or not an interrupted instruction is a CW instruction is provided in a task control block (TCB) on the main storage 6. The OS examines whether or not the interrupted instruction is a CW instruction. In the case where it is a CW instruction, the OS executes a BW timer stop instruction to stop the processing for update of the busy wait timer and sets the CW flag. In the case where the above task is to be dispatched again, the CW flag in the TCB is examined. When the flag is set, the CW flag is reset to "0" and a BW timer start instruction to start the processing for update of the busy wait timer is thereafter executed to dispatch this task.

According to the foregoing embodiment, when the CW instruction end signal "1" is sent out through the line 233, the content of the time limit register 131 for user is copied into the (R1+1)th general purpose register 113 designated by the R1 field Of a CW instruction. However, if a busy wait time caused by a CW instruction is needless, the coping may be unnecessary.

Also, according to the foregoing embodiment, the user sets the upper limit value of a busy wait time (or the upper limit value of a CW instruction execution time into the general purpose register 113). However, as shown in FIG. 5A, the upper limit value of a busy wait time can be set by providing a special purpose time limit register for user and using a load/store instruction for loading from and storing to the main storage 6.

Figure 5A:
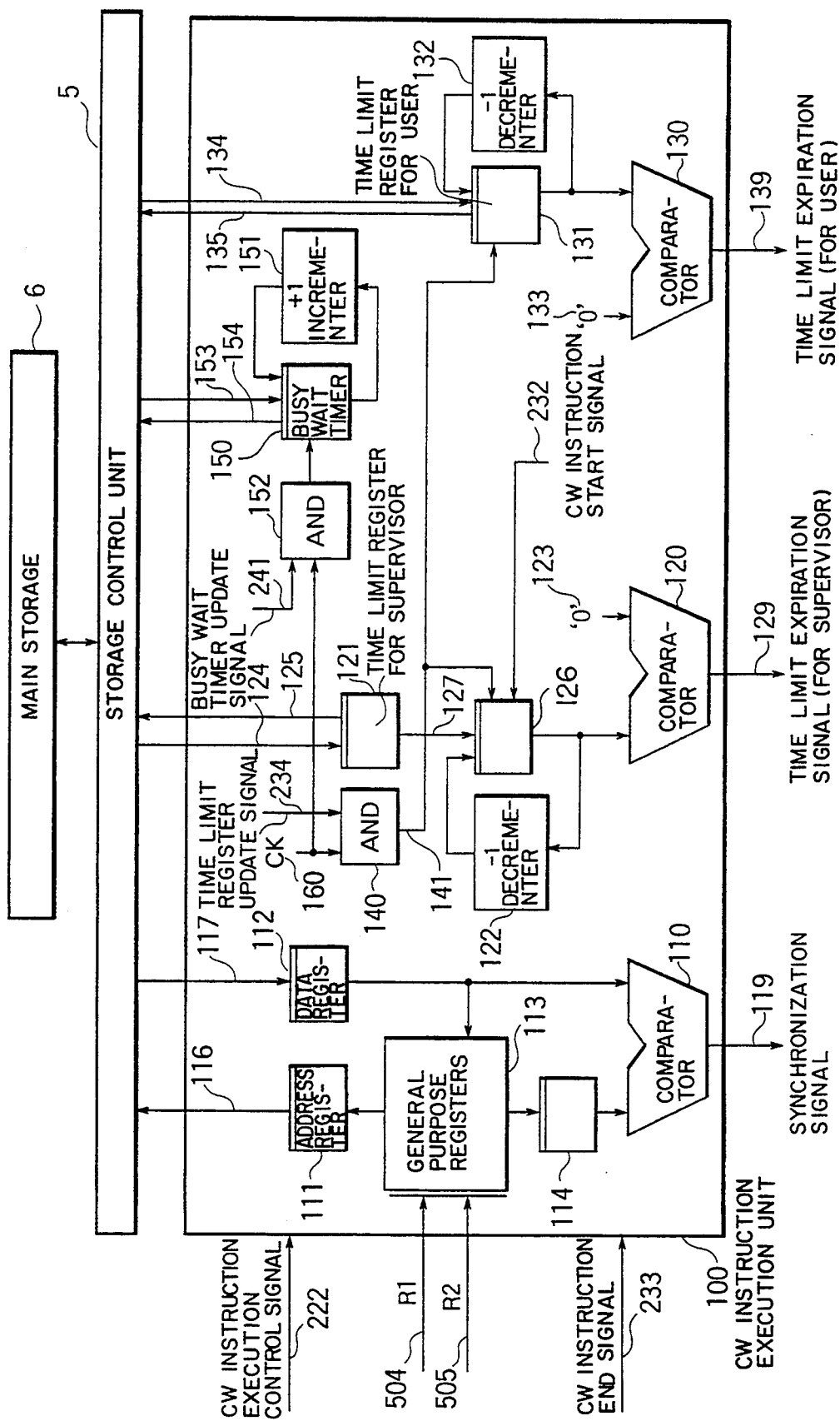
FIGS. 5A and 5B are circuit diagrams showing the details of CW instruction execution units in further embodiments of the present invention.

In FIG. 5A, reference numeral 131 denotes a time limit register for user. It is possible to load the content of the main storage 6 into the time limit register 131 for user through a line 134 and to store the content of the time limit register 131 for user into the main storage 6 through a line 135. The other components and construction are the same as those shown in FIG. 2A. Accordingly, in the present embodiment, a CW instruction is executed after a time limit value has been loaded into the time limit register 131 for user through in the foregoing embodiment a CW instruction is executed after a time limit value has been set to the general purpose register 113.

During a time when a time limit register update signal "1" comes through the line 234 as the result of detection of the CW instruction, the content of the time limit register 131 is decremented one by one in synchronism with a clock signal 160. The content of the time limit register 131 for user is compared with a constant "0" by the comparator 130. When the time limit register 131 for user becomes equal to or smaller than 0, a time limit expiration signal (for user) is sent out through the line 139. In this manner, it is possible to monitor the time limit of a busy wait time without the general purpose register 113 but by use of the special purpose time limit register 131 for user.

According to the embodiment shown in FIG. 5A, since the content of the time limit register for user itself is counted down during the execution of a CW instruction, it is necessary to set a time limit value to the time limit register for user each time a CW instruction is executed. But, the need to set a time limit value to the time limit register for user each time a CW instruction is executed, can be eliminated by providing an internal register for the exclusive use for count-down in addition to the time limit register for user, as shown in FIG. 5B.

Figure 5B:
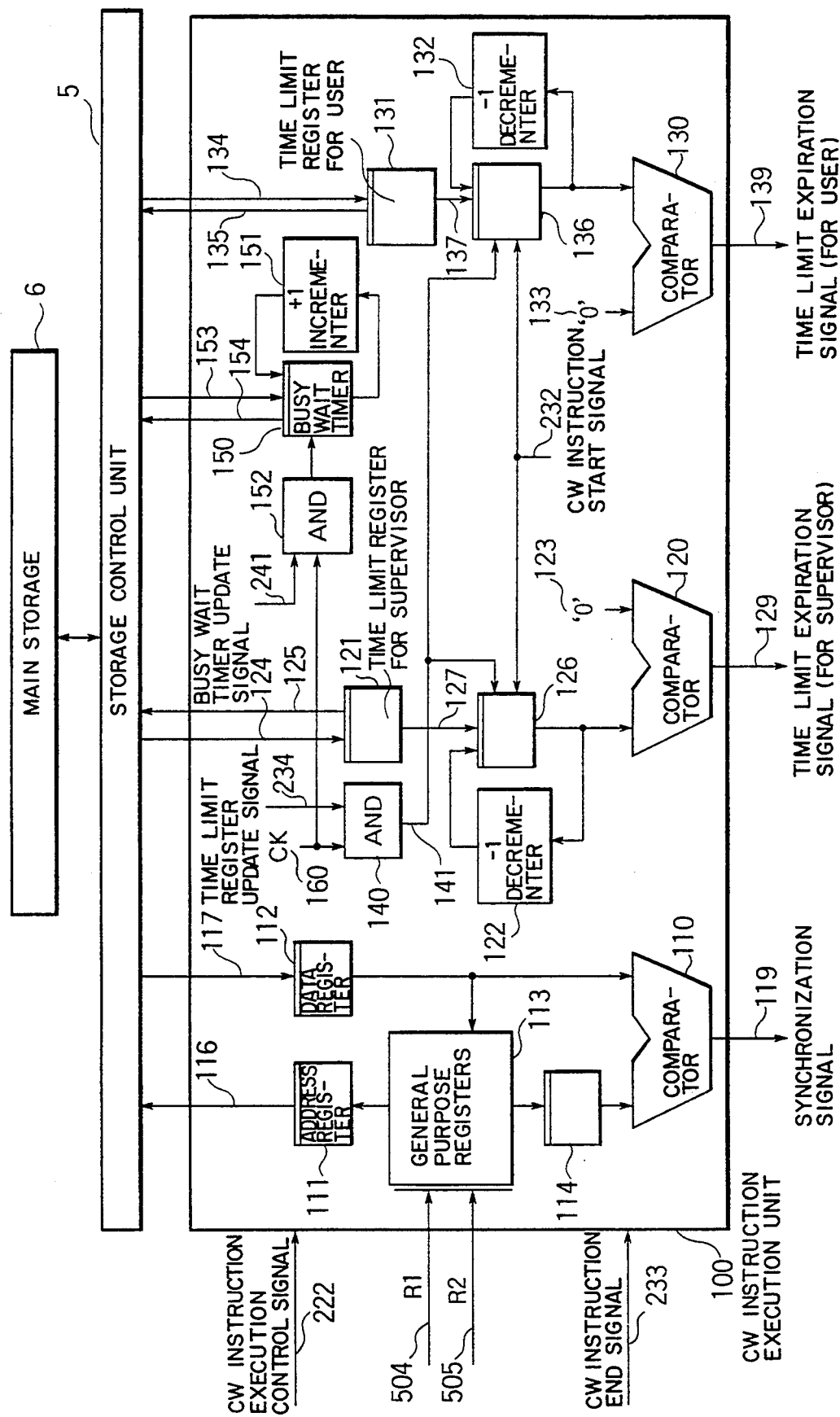

In FIG. 5B, reference numeral 131 denotes a time limit register for user and numeral 136 denotes an internal register. The other components are the same as those shown in FIG. 5A. It is possible to set a time limit value to the time limit register 131 for user through the line 134 from the main storage 6 and to store the content of the time limit register 131 for user into the main storage 6 through the line 135. When a CW instruction is detected and a CW instruction start signal "1" comes through the line 232, the content of the time limit register 131 for user is copied into the internal register 136 through a line 137. Thereafter, as has been mentioned in conjunction with the embodiment shown in FIG. 5A, the content of the internal register 136 is decremented one by one during a time when the line 234 (or a time limit register update signal) is "1". The content of the internal register 136 is compared with a constant "0" by the comparator 130. When the content of the internal register 136 becomes equal to or smaller than 0, a time limit expiration signal (for user) is sent out through the line 139. In this manner, it is possible to monitor a time limit by use of the internal register 136. On the other hand, since the content of the time limit register 131 for user itself is not decremented, it is not necessary to reset a time limit value if the value is set once.

According to the foregoing embodiment, the execution of a CW instruction is completed with the condition code being set to "2" in the case where the line 139 or the time limit expiration signal (for user) become "1" and with a CW interruption being generated in the case where the line 129 or the time limit expiration signal (for supervisor) becomes "1". However, as shown in FIG. 6A, the execution of a CW instruction may be completed with the condition code being to "2" both in the case where the line 139 or the time limit expiration signal (for user) becomes "1" and in the case where the line 129 or the time limit expiration signal (for supervisor) becomes "1". Also, as shown in FIG. 6B, the execution of a CW instruction may be completed with a CW interruption being generated both in the case where the line 139 or the time limit expiration signal (for user) becomes "1" and in the case where the line 129 or the time limit expiration signal (for supervisor) becomes "1".

In FIG. 6A, reference numeral 330 denotes a three-input OR gate. The other construction is the same as that shown in FIG. 2C excepting that the AND gate 350 and the NOT gates 351 and 352 are not provided. Referring to FIG. 6A, consider the case where the line 119 (or a synchronization signal) is "0" an the line 129 or 139 (or a time limit expiration signal) becomes "1". Since the line 119 is "0", the selector 310 selects a constant "2" and sends "2" to the condition code 320. When the line 129 or 139 (or the time limit expiration signal becomes "1" or one input of the three-input OR gate 330 becomes "1", the output of the OR gate 330 takes "1" so that "2" is set to the condition code 320. On the other hand, since a line 331 (or a condition code setting end signal) is connected to the output of the OR gate 330, a condition code setting end signal "1" is sent out through the line 331. In this manner, whichever time limit expiration signal becomes "1", the execution of a CW instruction is completed with "2" being set to the condition code.

In FIG. 6B, reference numeral 350 denotes a two-input AND gate and numeral 355 denotes a NOT gate. The other construction is the same as that shown in FIG. 2C excepting that the OR gate 330 and the NOT gate 351 are not provided. In FIG. 6B, consider the case where the line 119 (or a synchronization signal) is "0" and the line 129 or 139 (or a time limit expiration signal) becomes "1". Since the line 119 is "0", an input of the NOT gate 352 is "0" and hence the output of the NOT gate 352 takes "1". Also, since the line 129 or 139 is "1", the output of the OR gate 355 takes "1". Accordingly, two inputs of the AND gate 350 become both "1". As a result, a line 353 (or a CW interruption request signal) connected to the output of the AND gate 350 becomes "1" so that the interruption generation circuit 410 generates a CW interruption. In this manner, the execution of a CW instruction is completed with the CW interruption being generated whichever time limit expiration signal becomes "1".

Figure 7:
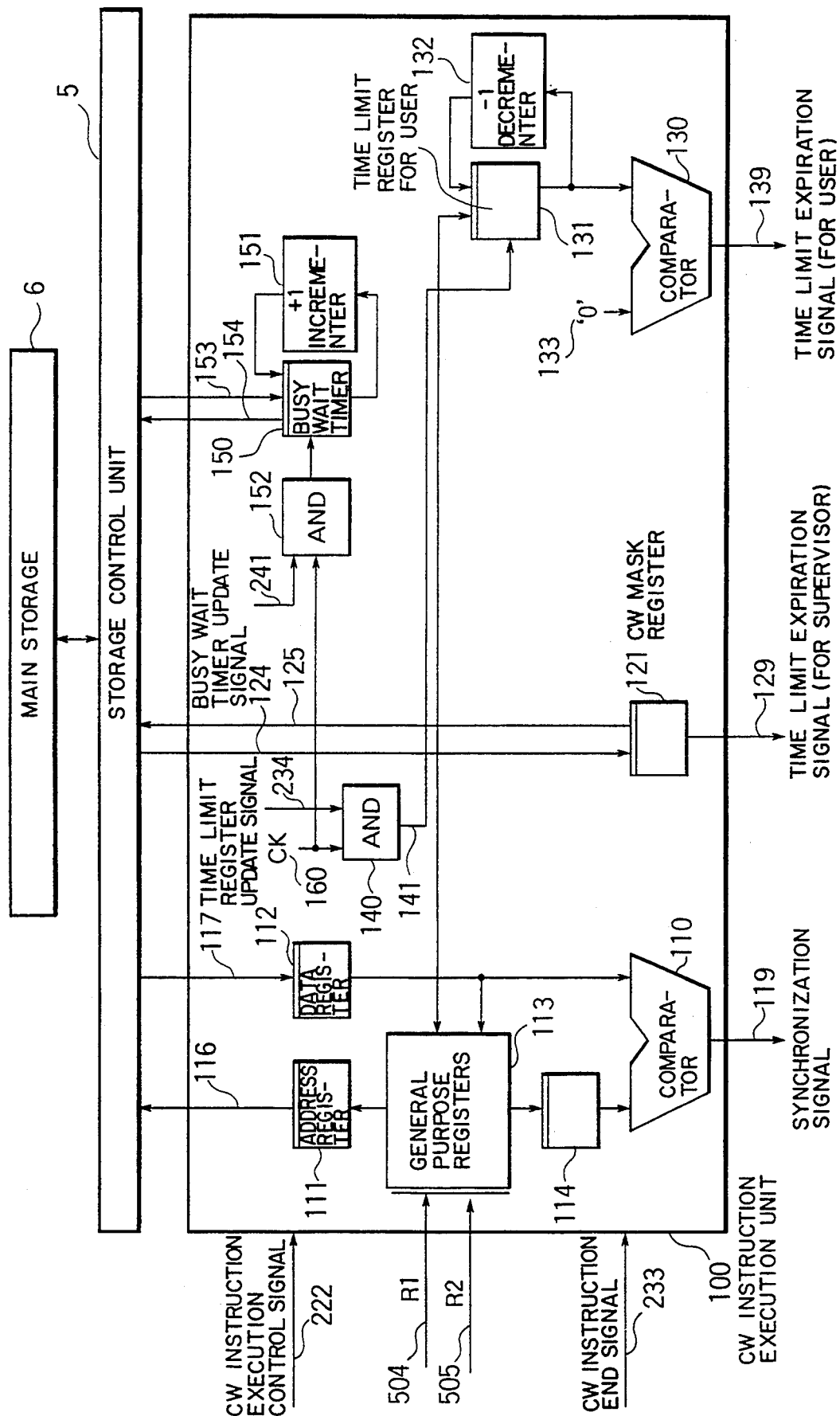
FIG. 7 is a circuit diagram showing the details of a CW instruction execution unit in a furthermore embodiment of the present invention.

According to the foregoing embodiment, in the case where the value of the time limit register for supervisor becomes equal to or smaller than 0, a time limit expiration signal (for supervisor) "1" is sent to the CW instruction end judgement circuit 300. Further, a CW interruption request signal "1" is sent from the CW instruction end judgement circuit 300 to the interruption generation circuit 400 which in turn generates a CW interruption, thereby completing the execution of a CW instruction. However, instead of the generation of a CW interruption based on a time limit may be employed a control in which a CW interruption is always generated or a CW interruption is not always generated, as shown in FIG. 7. Namely, there may be employed a method in which the case of performing a synchronization processing with the intervention of an OS upon the opportunity of a CW interruption and the case of continuously performing a CW instruction with the exclusive use of a processor being taken (or the case of having a busy wait) are preliminarily distinguished uniquely in accordance with an environment in which the system is operated.

In FIG. 7, reference numeral 121 denotes a CW mask register. The other construction is the same as that shown in FIG. 2A excepting that the comparator 120, the time limit register 121 for supervisor, the decrementer 122 and the internal time limit register 126 for supervisor in FIG. 2A are not provided.

The CW mask register 121 is a one-bit register and controls whether or not a CW interruption should be generated. It is possible to load the content of the main storage 6 into the CW mask register 121 through a line 124 and to store the content of the CW mask register 121 into the main storage 6 through a line 125.

In the case where the content of the CW mask register 121 is "0", "0" is always sent to the CW instruction end judgement circuit 300 through a line 129 (for a time limit expiration signal for supervisor). Accordingly, the issuance of a CW interruption request signal from the CW instruction end judgement circuit 300 to the interruption control unit 400 does not occur and hence the generation of a CW interruption does not occur. Namely, a synchronization processing based on a busy wait is performed. On the other hand, in the case where the content of the CW mask register 121 is "1", a time limit expiration signal (for supervisor) "1" is always sent to the CW instruction end judgement circuit 300 through the line 129. Accordingly, when a CW instruction is executed, a CW interruption request signal is always sent to the interruption control unit 400 and a CW interruption is always generated so long as a synchronization signal does not come through the line 119.

Namely, a synchronization processing with the intervention of an OS is performed.

In the foregoing embodiment, there are provided two time limit registers which include the time limit register 121 for supervisor and the time limit register 131 for user. However, the system can be constructed with the use of only one time limit register. In the case where only the time limit register 131 for user is provided, a constant "0" is connected to the line 129 so that the time limit expiration signal (for supervisor) is not sent out. In the case where only the time limit register 121 for supervisor is provided, a constant "0" is connected to the line 139 so that the time limit expiration signal (for user) is not sent out.

According to the foregoing embodiment, the clock signal (CK) 160 is synchronous with the fundamental clocks of the processing system, that is, the machine cycle. However, the clock signal (CK) 160 can be synchronized with an absolute time, for example, every 100 nano seconds. Also, the accuracy can be determined or made coarse in such a manner that every 100 machine cycles is used instead of every one machine cycle. Further, the clock signal (CK) 160 may be synchronized with the re-compare request signal sent through the line 342. Thereby, the maximum CW instruction execution time can be designated by the number of times of execution of the comparison processing for judging whether or not the synchronization has been accomplished.

According to the foregoing embodiment, when the content of a general purpose register 113 the register number of which is designated by the R1 field of a CW instruction (data of the first operand) becomes unequal to the data of the main storage at its address designated by a general purpose register designated by the R2 field of the CW instruction (data of the second operand), the comparator 110 in FIG. 2A sends out a synchronization signal "1" through the line 119. Namely, a busy wait is taken by continuing a comparison processing with the unequality of the two operands of the CW instruction being taken as the condition of synchronization. However, even in the case where a condition under which the comparator 110 sends out the synchronization signal "1" through the line 119 is different from the above case or condition, the foregoing embodiment is easily applicable.

For example, if the comparator 110 is constructed to send out the synchronization signal "1" when the content of the latch 114 and the content of the data register 112 are equal to each other, the condition of synchronization is that data of the first operand and data of the second operand equal to each other.

If the comparator 110 is constructed to send out the synchronization signal "1" when the content of the latch 114 is larger than the content of the data register 112, the condition of synchronization is that data of the first operand becomes larger than data of the second operand.

If the comparator 110 is constructed to send out the synchronization signal "1" when the content of the latch 114 is equal to or larger than the content of the data register 112, the condition of synchronization is that data of the first operand becomes equal to or larger than data of the second operand.

If the comparator 110 is constructed to send out the synchronization signal "1" when the content of the latch 114 is smaller than the content of the data register 112, the condition of synchronization is that data of the first operand becomes smaller than data of the second operand.

If the comparator 110 is constructed to send out the synchronization signal "1" when the content of the latch 114 is equal to or smaller than the content of the data register 112, the condition of synchronization is that data of the first operand becomes equal to or smaller than data of the second operand.

According to the foregoing embodiment, a comparison processing is continued until there is satisfied one even that the content of the R1-th general purpose register 113 designated by the R1 field of a CW instruction (data of the first operand) becomes unequal to the data of the main storage at its address designated by the R2-th general purpose register designated by the R2 field of the CW instruction (data of the second operand). However, by use of the foregoing embodiment can be easily realized a construction in which the comparison processing is continued until there is satisfied either one of two events including an event that the content of the R1-th general purpose register 113 designated by the R1 field of a CW instruction becomes unequal to the data of the main storage at its address designated by the R2-th general purpose register designated by the R2 field of the CW instruction and an event that the content of the (R1−1)th genera purpose register 113 becomes unequal to the data of the main storage at its address designated by the (R2+1)th general purpose register. In this case, the maximum CW instruction execution time is set to the (R1+2)th general purpose register 113.

Figure 10A:
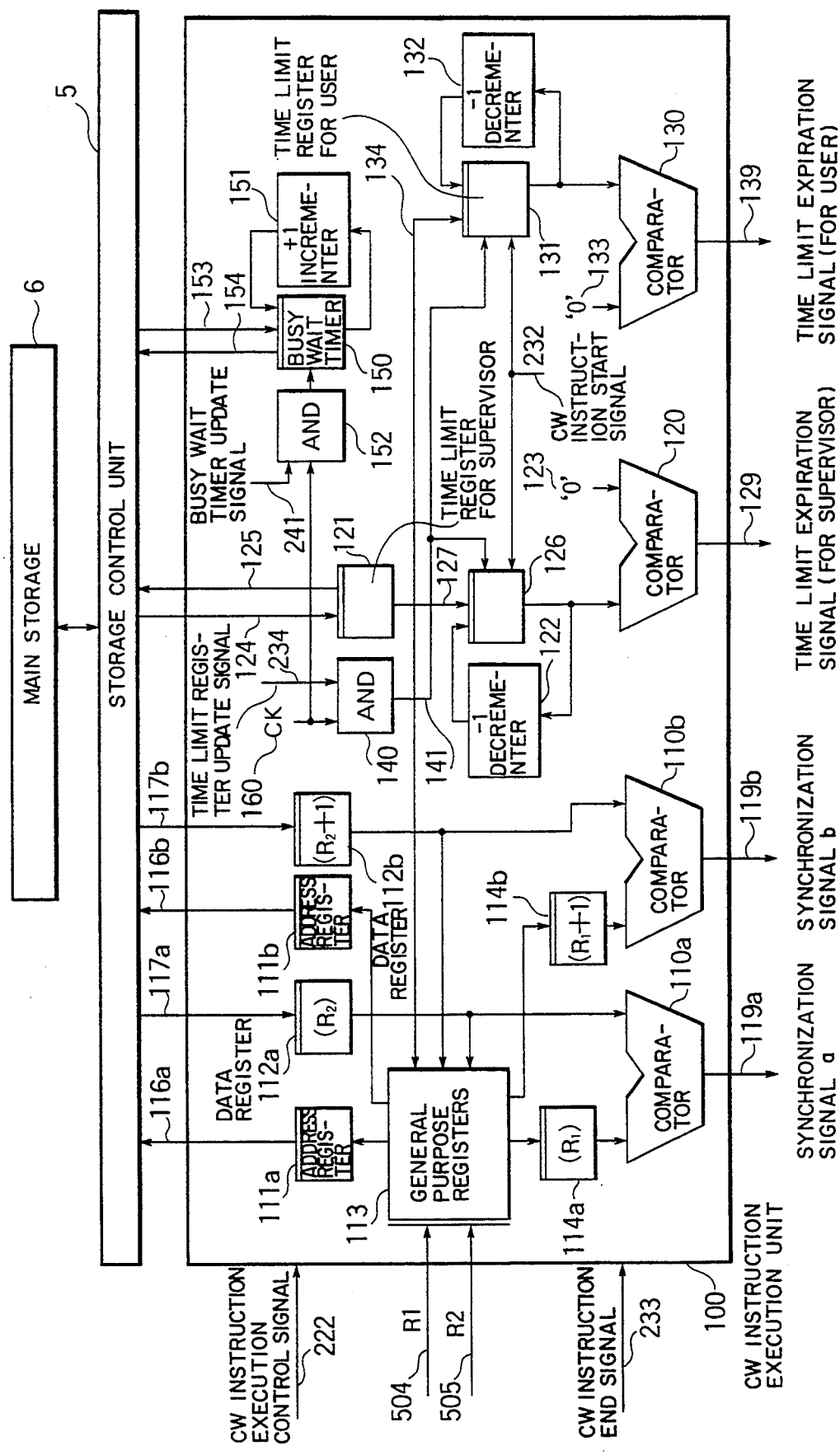
Figure 10B:
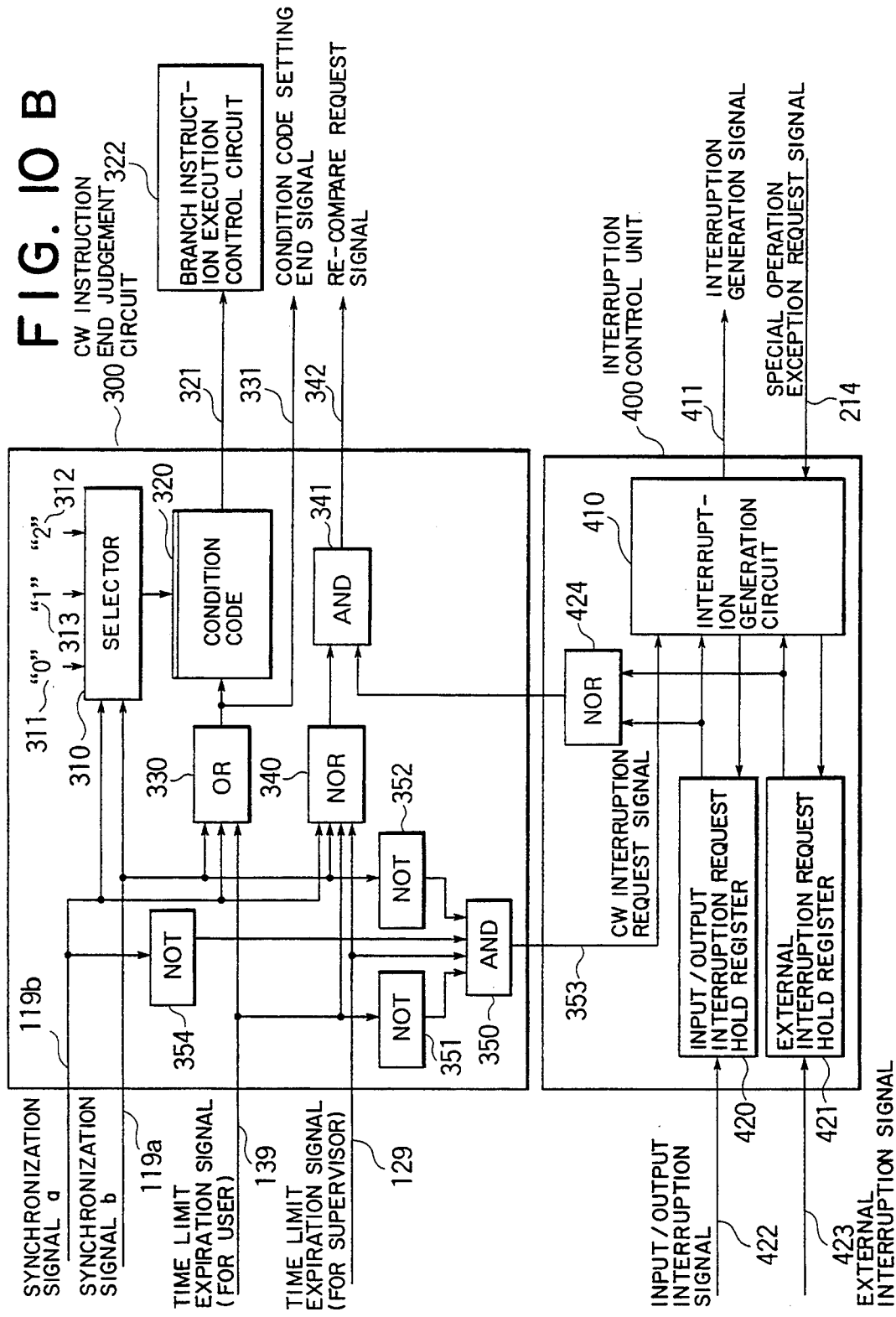

FIG. 10A shows the details of a CW instruction execution unit 100 and FIG. 10B shows the details of a CW instruction end judgement circuit 300 and an interruption control unit 400.

In FIG. 10A, reference numeral 100 denotes a CW instruction execution unit. In the CW instruction execution unit 100, numerals 110a and 110b denote comparators, numerals 111a and 111b address registers, numerals 112a and 112b data registers, numeral 113 a general purpose registers, and numerals 114a and 114b latches. The other components are the same as those shown in FIG. 2A.

An operation related to the time limit register 121 for supervisor, the time limit register 131 for user and the busy wait timer 150 is quite the same as that in the embodiment shown in FIG. 2A. In the following, an operation related to the comparators 110a and 110b will be explained in detail.

In accordance with the control of a CW instruction execution control signal (on the line 222), the content of the main storage 6 at its address designated by the R2-th general purpose register 113 designated by the R2 field of a CW instruction is compared with the content of the R1-th general purpose register 113 designated by the R1 field of the CW instruction and the content of the main storage 6 at its address designated by the (R2+1)th general purpose register 113 designated by the R2 field of the CW instruction is compared with the content of the (R1+1)th general purpose register 113 designated by the R1 field of the CW instruction.

The content of the R2-th general purpose register 113 and the content of the (R2+1)th general purpose register 113 designated by the line 505 are read therefrom to the address registers 111a and 111b, respectively. The content of the address register 111a is sent to the storage control unit 5 through a line 116a and the content of the main storage 6 its address designated by the address register 111a is fetched from the main storage 6 to the data register 112a through a line 117a. Also, the content of the address register 111b is sent to the storage control unit 5 through a line 116b and the content of the main storage 6 at its address designated by the address register 111b is fetched from the main storage 6 to the data register 112b through a line 117b.

Also, the content of the R1-th general purpose register 113 and the content of the (R1+1)th general purpose register 113 designated by the line 504 are read therefrom to the latches 114a and 114b, respectively.

The comparator 110a compares the content of the latch 114a and the content of the data register 112a. In the case where both the contents are not equal to each other, the comparator 110a sends out a synchronization signal a "1" through a line 119a, indicating that synchronization between processors has been accomplished. Further, the content of the data register 112a is written into the R1-th general purpose register 113 designated by the R1 field of the instruction. Similarly, the comparator 110b compares the content of the latch 114b and the content of the data register 112b. In the case where both the contents are not equal to each other, the comparator 110b sends out a synchronization signal b "1" through a line 119b, indicating that synchronization between processors has be accomplished. Further, the content of the data register 112b is written into the (R1+1)th general purpose register 113 designated by the R1 field of the instruction.

FIG. 10B shows the details of the CW instruction end judgement circuit 300 and the interruption control unit 400.

In the CW instruction end judgement circuit 300, reference numeral 310 denotes a selector, numeral 311 a constant "0", numeral 312 a constant "2", numeral 313 a constant "1", numeral 320 a condition code, numeral 322 a branch instruction execution control circuit, numeral 330 an OR gate, numeral 340 a NOR gate, numerals 341 and 350 AND gates, and numerals 351, 352 and 354 NOT gates. The interruption control unit 400 is the same as that shown in FIG. 2C.

In the CW instruction end judgement circuit 300, the line 119a or 119b serves as a selection signal for the selector 310. The selector 310 selects the constant "2" when the lines 119a and 119b are both "0", the constant "0" when the line 119a is "1" and the line 119b is "0" or "1", and the constant "1" when the 119a is "0" and the line 119b is "1". The output of the selector 310 is set to the condition code 320 when the output of the OR gate 330 becomes "1".

(a) Explanation will be made of the case where the synchronization signal a "1" comes from the CW instruction execution unit 100 through the line 119a. When the line 119a (or the synchronization signal a) becomes "1", the selector 310 selects the constant "0" and hence the output of the selector 310 takes "0". At this time, the output of the OR gate 330 becomes "1" since one input thereof connected to the line 119a (or the synchronization signal a) is "1". Accordingly, "0" is set to the condition code 320. Since a line 331 which is the output of the OR gate 330 takes "1", a condition code setting end signal "1" is sent to the CW instruction execution control unit 200. Thus, the execution of the CW instruction is completed with the condition code being set to "0".

(b) Next, explanation will be made of the case where "0" comes from the CW instruction execution unit 100 through the line 119a (for synchronization signal a) and the synchronization signal b "1" comes from the CW instruction execution unit 100 through the line 119b. When the line 119a (for the synchronization signal a) becomes "0" and the line 119b (or the synchronization signal b) becomes "1", the selector 310 selects the constant "1" and the output of the selector 310 takes "1". At this time, since the line 119b (or the synchronization signal b) which is one input of the OR gate 330 becomes "1", the output of the OR gate 330 takes "1". Accordingly, "1" is set to the condition code 320. Since the line 331 which is the output of the OR gate 330 takes "1", a condition code setting end signal "1" is sent to the CW instruction execution control unit 200. Thus, the execution of the CW instruction is completed with the condition code being set to "1".

(c) Explanation will be made of the case where "0" through the line 119a (for the synchronization signal a), "0" through the line 119b (for the synchronization signal b) and a time limit expiration signal (for user) "1" through a line 139 comes from the CW instruction execution unit 100. Since the lines 119a and 119b are "0", the selector 310 selects the constant "2" and the output of the selector 310 takes "2". At this time, since the line 139 (or the time limit expiration signal (for user)) which is one input of the OR gate 330 becomes "1", the output of the OR gate 330 takes "1". Accordingly, "2" is set to the condition code 320. Since the line which is the output of the OR gate 330 takes "1", a condition code setting end signal "1" is sent to the CW instruction execution control unit 200. Thus, the execution of the CW instruction is completed with the condition code being set to "2".

The condition code 320 is set through a line 321 to the branch instruction execution control circuit 322 which judges the condition of a branch instruction. Accordingly, programming can be made in which a processing succeeding the CW instruction differs in accordance with the condition code. Since the branch instruction execution control circuit 322 is known, detailed explanation thereof will be omitted. One example of the programming is as follows. The case where the condition code is "0", means that a synchronization processing based on use of the R1-th and R2-th general purpose registers has normally been finished. In such a case, therefore, an instruction sequence succeeding the synchronization processing is executed. The case where the condition code is "1", means that a synchronization processing based on use of the (R1+1)th and (R2+1)th general purpose registers has normally been finished. In such a case, therefore, an instruction sequence succeeding the synchronization processing is executed. On the other hand, the case where the condition code is "2", means that a synchronization processing based on a busy wait has reached a time limit. In such a case, therefore, a supervisor interruption is generated (for example, a WAIT macro is executed) and a synchronization processing with the intervention of an OS is performed, thereby contemplating the effective utilization of the processing system. Namely, the effective utilization is contemplated by allowing the OS to dispatch another task.

(d) Explanation will be made of the case where "0" comes from the CW instruction execution unit 100 through the line 119a (for the synchronization signal the line 119*b* (for the synchronization signal b) and the line 139 (for the time limit expiration signal (for user)) and a time limit expiration signal (for supervisor) "1" comes from the CW instruction execution unit 100 through a line 129. Since the lines 119*a*, 119*b* and 139 are all "0" and hence three inputs of the OR gate 330 are all "0", the output of the OR gate 330 takes "0" and hence the line 331 (for the condition code setting end signal) takes "0". On the other hand, since the line 119*a* is "0", the output of the NOT gate 352 becomes "1". Since the line 119*b* is "0", the output of the NOT gate 354 becomes "1". Since the line 139 is "0", the output of the NOT gate 351 becomes "1". Accordingly, all of four inputs of the AND gate 350, that is, the output of the NOT gate 351, the output of the NOT gate 352, the output of the NOT gate 354 and the line 129 (or the time limit expiration signal (for supervisor)) take "1". Therefore, the output of the AND gate 350 becomes "1" which is in turn sent as a CW interruption request signal "1" to the interruption control unit 400 through a line 353. A CW interruption is generated in the interruption control unit 400, thereby completing the execution of the CW instruction.

(e) Next, explanation will be made of the case where "0" comes from the CW instruction execution unit 100 through all the line 119*a* (for the synchronization signal a), the line 119*b* (for the synchronization signal b), the line 139 (for the time limit expiration signal (for user)) and the line 129 (for the time limit expiration signal (for supervisor)).

(e1) Firstly, the explanation will be made in conjunction with the case where an input/output interruption request hold register 420 and an external interruption request hold register 421 are both "0". In this case, since two inputs of an NOR gate 424 are both "0", the output of the NOR gate 424 takes "1". On the other hand, in the CW instruction end judgement circuit 300, since four inputs of the NOR gate 340 or the lines 119*a*, 119*b*, 129 and 139 are all "0", the output of the NOR gate 340 takes "1". Since two inputs of the AND gate 341 or the output of the NOR gate 340 and the output of the NOR gate 424 are both "1", the output of the AND gate 341 takes "1" which is in turn sent as a re-compare request signal "1" to the CW instruction execution control unit 200 through a line 342. The CW instruction execution control unit 200 controls the CW instruction execution unit 100 again so that a comparison processing as having already been mentioned is repeated. Namely, a busy wait is taken.

(e2) In the case where either the input/output interruption request hold register 420 or the external interruption request hold register 421 is "1", the output of the NOR gate 424 takes "0". In this case, since one input of the AND gate 341 or the output of the NOR gate 424 is "0", the output of the AND gate 341 takes "0". Namely, the line 342 remains "0" and hence no re-compare request signal is delivered. On the other hand, an interruption generation circuit 410 generates the requested input/output interruption or external interruption. Thus, the execution of the CW instruction is completed.

The subsequent operation is the same as that explained by use of FIGS. 2A to 2C.

As apparent from the above, by use of the foregoing embodiment or according to the present embodiment, it is possible to realize a construction in which a comparison processing is continued until either one of two events is satisfied.

As explained above, according to the present invention, since the maximum time for busy wait can be set and synchronization with interruption of an operating system can be accomplished, the OS can dispatch other task instead of a task under busy wait and it is possible even under a multi-job environment to contemplate the effective utilization of the processing system, thereby preventing the deterioration of the job throughput. Also, it is possible to reflect a time required for busy wait in an account for each job.

Finally, another embodiment of an information processing system for realizing the CW instruction which is an embodiment of the present invention, will be explained by use of FIG. 11 and FIGS. 1 and 2B.

Figure 11:
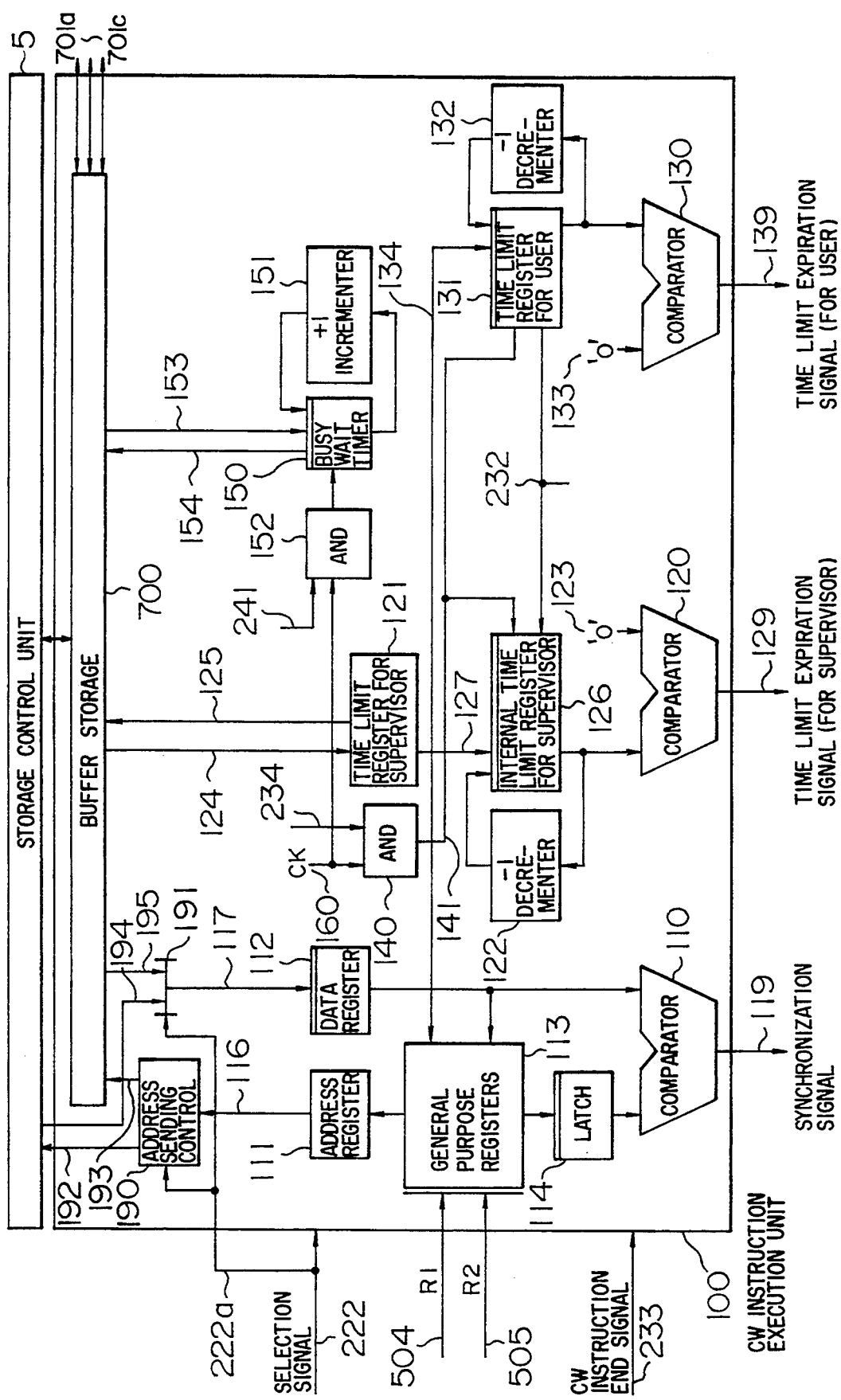

In FIG. 11, reference numeral 190 denotes an address sending control circuit, numeral 191 a selector, and numeral 700 a buffer storage. The other construction shown in FIG. 11 is the same as that shown in FIG. 2A excepting that the main storage 6 is omitted.

The buffer storage 700 holds the copy of a part of the main storage 6. In the case where a multitasking is performed while accomplishing synchronization between a plurality of processors (1 and 2), the synchronization is accomplished by use of common data which exists at the same position in the main storage. Namely, the synchronization is accomplished in such a manner that a first processor 1 waits for SEM to become "1" and a second processor 2 stores "1" into SEM.

The buffer storage 700 in the first processor 1 holds the copy of the content of SEM in the main storage 6, thereby performing a comparison processing. The second processor 2 notifies the accomplishment of synchronization by rewriting the content of SEM in the main storage 6 into "1". At this time, SEM held by the buffer storage 700 in the first processor 1 is invalidated through a line 701*a*. As a result, when the first processor 1 makes again the comparison of the content of SEM with "1", the copy of SEM in the main storage 6 is not present in the buffer storage 700 in the first processor 1. In this case, the content of SEM as newly rewritten is block-transferred to from the main storage 6 to the buffer storage 700. Thereafter, a comparison processing is performed to judge the accomplishment of synchronization.

As has already been mentioned in detail, in the case where a CW instruction is detected by the instruction decoder 500 in FIG. 2B, the control circuit 220 sends a CW instruction execution control signal to the CW instruction execution unit 100 through the line 222 to control the execution of the processing of steps 920, 925, 930 and 935 in the flow chart of FIG. 3B which shows the procedure for the CW instruction. Further, the control circuit 220 sends "1" through a line 222*a* to the address sending control circuit 190 and the selector 191 which are shown in FIG. 11. The line 222 shown in FIG. 2B includes the line 222*a*.

In FIG. 11, the address sending control circuit 190 sends, the content of the address register 111 sent through the line 116, to the storage control unit 5 through a line 192 in the case where the circuit 190 receives "1" through the line 222*a* and to the buffer storage 700 through a line 193 in the case where the control circuit 190 does not receive "1". When receiving "1" through the line 222a, the selector 191 selects a line 195 so that data fetched from the buffer storage 700 is sent to the data register 112 through the line 117. When "1" is not received, the selector 191 selects a line 194 so that data sent from the storage control unit 5 is sent to the data register through the line 117.

Accordingly, in the case where the CW instruction is detected in the instruction decoder 500, the content of the main storage 6 at its address designated by the general purpose register 113 having a register number designated by the R2 field of the CW instruction is fetched to the data register 112 not from the buffer storage 700 but directly from the main storage 6 so that it is compared with the content of the general purpose register 113 having a register number designated by the R1 field of the CW instruction.

Thus, according to the present embodiment, common data in the main storage to which the CW instruction refers and which is used for synchronization between tasks, can be fetched not from the buffer storage 700 but directly from the main storage 6. Accordingly, the occurrence of block transfer upon accomplishment of synchronization can be avoided, thereby making it possible to shorten a processing time required upon accomplishment of synchronization.

We claim:

1. An information processing system, comprising:
   first and second processors;
   a main storage shared by said first and second processors;
   each processor of said first and second processors including:
   an instruction execution circuit for executing a watching instruction issued by one program being executed by said processor, the watching instruction being for watching information for synchronization which will be written into said main storage by another program being executed by another of said first and second processors for synchronization with said one program;
   said instruction execution circuit including:
   (a) reading means responsive to the watching instruction for reading out first data from a location within said main storage designated by the watching instruction, the location being one which said information for synchronization will be written by said another program;
   (b) comparing means for comparing the first data as read out by said reading means to second data for synchronization held within said processor and for outputting a signal indicative of accomplishment of synchronization when a predetermined result of comparison has been obtained;
   (c) repeating means connected to said comparing means and responsive to said watching instruction for causing said reading means to repeat reading operations in cases where a result of comparison by said comparing means does not match said predetermined result of comparison, so that said first data held in said location is repetitively read out and supplied to said comparing means for repetitive comparison with said second data, until a match with said predetermined result of comparison is obtained by said comparing means;
   (d) limiting means for holding a preset upper limit for limiting continued performance of a repetitive reading operation;
   (e) detecting means connected to said repeating means and said limiting means and responsive to said watching instruction for detecting whether a repeated reading operation has reached said preset upper limit; and
   (f) terminating means connected to said detecting means and said comparing means for terminating execution of said watching instruction either when a match with a said predetermined result has been obtained by said comparing means before said repeated reading operation has reached said preset upper limit, or when said repeated reading operation has reach said preset upper limit before a match with said predetermined result of comparison has been obtained by said comparing means.

2. An information processing system according to claim 1, wherein said second data is data held in one register designated by said watching instruction, said one register being included among a plurality of registers provided in said processor.

3. An information processing system according to claim 2, wherein said limiting means is a second register of said plurality of registers, which is designated by said watching instruction.

4. An information processing system according to claim 1, wherein said limiting means comprises:
   first holding means for holding a first upper limit determined by said one program; and
   second holding means for holding a second upper limit determined by a supervisor program of said processor;
   wherein said detecting means comprises;
   means for detecting whether said repeated reading operation has reached either one of said first and second upper limits.

5. An information processing system according to claim 1, wherein each processor further includes:
   interruption holding means for holding an interruption request which has been provided to said processor from an external device, in a pending state until said interruption request can be processed by said processor;
   interruption detecting means for detecting whether a pending interruption request is being held in said interruption holding means, each time a repetitive comparison has been made by said comparing means, but the predetermined result of comparison has not been obtained, and said preset upper limit has not yet been reached; and
   interruption means responsive to detection of a pending interruption for supplying a signal indicative of generation of an interruption to said processor and for terminating execution of said watching instruction.

6. An information processing system according to claim 1, wherein said instruction execution circuit further includes:
   instruction holding means for holding a permission instruction issued by a supervisor program of said processor before an issuing of said watching instruction by said one program for indicating whether or not any execution of a watching instruction issued by said one program should be permitted;

permission detecting means responsive to issuing of said watching instruction by said one program for detecting whether or not execution of said issued watching instruction is permitted, based upon said permission instruction; and interruption means for generating an interruption when a determination is made by said permission detecting means that execution of said watching instruction is not permitted and for preventing execution of said watching instruction.

7. An information processing system according to claim 1, wherein said preset upper limit comprises an upper limit execution time for limiting an amount of time for performing said watching instruction.

8. An information processing system according to claim 1, wherein said preset upper limit comprises an upper limit number corresponding to a maximum number of times of performance of a repetition of comparison by said comparing means.

9. An information processing system according to claim 1, wherein said terminating means includes:

means for supplying another circuit provided within said processor with a condition code which varies depending on which of first and second timings said watching instruction has been terminated on by said terminating means, said first and second timings respectively corresponding to:

a first timing when repetition of comparison has reached said preset upper limit before a match with said predetermined result of comparison is obtained by said comparing means, and a second timing when a match with said predetermined result has been obtained by said comparing means before repetition of comparison has reached said preset upper limit; and wherein another circuit uses said condition code for execution of a branch instruction.

10. An information processing system according to claim 1, wherein said instruction execution circuit further includes:

a counter for maintaining a total amount of CPU time spent for execution of plural watching instructions issued by said one program for watching at least one information for synchronization; and time means connected to said terminating means and responsive to each of said plural watching instruction, said time means for supplying to said counter a count up signal until said terminating means terminates execution of each issued watching instruction, so that said counter accumulates a total amount of CPU time spent for execution of said plural watching instructions issued by said one program.

11. An information processing system according to claim 1, further comprising:

a counter for maintaining a total amount of CPU time spent for execution of plural watching instruction s issued by said one program for watching at least one information for synchronization; and means responsive to: each of first plural instructions of a first kind issued by said one program, said first plural instructions being issued before an issuing of each of said plural watching instructions, for supplying to said counter a count up signal; and, each of second plural instructions of a second kind issued by said one program, said second plural instructions being issued after completion of execution of each of said plural watching instructions, for terminating supply of said count up signal to said counter, so that said counter accumulates a total amount of CPU time spent for execution of said plural watching instructions issued by said one program.

12. An information processing system, comprising:

a plurality of processors;

a main storage shared by said processors;

each processor of said processors including:
  (a) a plurality of registers;
  (b) an instruction execution circuit for executing a watching instruction issued by one program being executed by said processor, said watching instruction being for watching information for synchronization which will be written into said main storage by another program being executed by another of said processors for synchronization with said processor, said instruction execution circuit including,
    (b1) a fetch circuit responsive to said watching instruction for fetching first information for synchronization from a location of said main storage as designated by address information held in a first register requested by said watching instruction;
    (b2) a first comparator for comparing the fetched first information for synchronization to second information held in a second register requested by said watching instruction;
    (b3) an execution control circuit responsive to said watching instruction for causing said fetch circuit to repeat the fetching of said first information for synchronization from said location for repetitive comparison by said first comparator when a result of a comparison by said first comparator does not match said second information;
    (b4) a limit register for holding limit information indicative of an upper limit on continued performance of a repetitive comparison;
    (b5) limit detecting means connected to said execution control circuit and responsive to said watching instruction for detecting whether repetitive comparison caused by said execution control circuit has reached said upper limit indicated by said limit information held by said limit register; and
    (b6) an end judgment circuit connected to said first comparator and said limit detecting means for terminating execution of said watching instruction either when a result of comparison by said first comparator is found to match said second information or when repetitive comparison by said first comparator has reached said upper limit indicated by said limit information held in said limit register.

13. An information processing system according to claim 12, wherein said limit register includes:

a first limit register for holding first limit information indicative of a first upper limit specified by said one program for repetitive comparison; and a second limit register for holding second limit information indicative of a second upper limit specified by a supervisor program of said processor for repetitive comparison, and wherein said limit detecting means includes:

first detecting means for detecting whether or not the repetitive comparison caused by said execution control circuit has reached said first upper limit, and second detecting means for detecting whether or not the repetitive comparison caused by said execution control circuit has reached said second upper limit, and wherein said execution control circuit includes means for terminating execution of said watching instruction when an output of either said first detecting means or said second detecting means becomes a predetermined value before a result of comparison by said first comparator indicates a match with said second information.

14. An information processing system according to claim 13, wherein said end judgment circuit further includes:

means for outputting a predetermined condition code to a control circuit for a branch instruction provided within said processor when said first detecting means has detected that the repetitive comparison has reached said first upper limit before a result of comparison by said first comparator indicates a match with said second information; and means for suspending execution of said one program and for interrupting the supervisor program of said processor when said second detecting means has detected that the repetitive comparison has reached said second upper limit before a result of comparison by said first comparator indicates a match with said second information.

15. An information processing system according to claim 12, wherein said instruction execution circuit further includes a counting circuit which is activated each time when one of plural watching instructions for watching a same information for synchronization or different information for synchronization is executed by said instruction execution circuit for said one program, and which counts an accumulated value of CPU time exhausted during execution of said plural watching instructions.

16. An information processing system according to claim 12, wherein said limit information held in said limit register indicates a number corresponding to a maximum number of times of repetitive comparison to be executed by said first comparator.

17. An information processing system according to claim 12, wherein said information held in said limit register indicates total CPU time to be spent for execution of the watching instruction.

18. An information processing system, comprising:
a plurality of first and second processors;
a main storage shared by said first and second processors;
each processor of said first and second processors including:
a buffer storage for holding a plurality of blocks each of which is a part of data of said main storage;
instruction decode means responsive to each of first instructions of a first kind which requests that data held at a read-request address in said main storage is to be fetched for generating a read request, and responsive to each of second instructions of a second kind which requests that data is to be written into said main storage at a write-request address for generating a write request;
said second instructions of the second kind including an instruction for writing into said main storage, information for synchronization between two programs being executed by said first and second processors, respectively;

buffer storage read control means responsive to said read request for selectively transferring read-requested data within one block which is held in said buffer storage and to which said read-requested data belongs, including means for reading said one block from said main storage into said buffer storage before execution of the transferring in a case where said one block is absent from said buffer storage;

buffer storage write control means responsive to said write request for writing said write-requested data into part of another block which should include said write-requested data, including means for reading said another block from said main storage into said buffer storage before execution of the writing in a case where said another block is absent from said buffer storage;

buffer storage invalidating means responsive to said writing, for supplying said buffer storage of another of said first and second processors with a signal requesting invalidation of said another block held in said buffer storage if there is said another block in a buffer storage of said another processor, and responsive to a signal which is supplied from another processor that requests invalidation of a block, for invalidating said requested block in a case where the block requested is present in said buffer storage;

instruction execution means responsive to one of said first instructions of the first kind issued by one program being executed by said processor for supplying said main storage with said read request and said read address both generated by said instruction decode means for said one instruction of the first kind so as to read said information for synchronization from said main storage and for prohibiting said buffer storage read control means to respond to that read request and that read address both generated for said one instruction by said instruction decode means, so that a block to which said information for synchronization belongs is not transferred to said buffer storage of said processor;

wherein said one instruction is one which requires reading from said main storage, of information for synchronization which will be updated by another program being executed by said another processor for synchronization of said one program with said another program.

19. An information processing system according to claim 18, wherein said one instruction is a watching instruction for watching information for synchronization which will be written into said main storage by another program being executed by another of said first and second processors, wherein each processor further includes:

a plurality of registers;
wherein said instruction execution means further includes:
a fetch circuit responsive to said watching instruction for fetching information for synchronization from a location of said main storage designated by address information held in a first one of said registers requested by said watching instruction;
a first comparator to compare the fetched information for synchronization to information held in a second one of the registers requested by said watching instruction;

an execution control circuit responsive to said watching instruction for causing said fetch circuit to repeat the fetching of the information for synchronization from said location for repetitive comparison by said first comparator with said information held in said second register, when the result of the comparison by said first comparator is not a predetermined value;

a limit register for holding information indicative of an upper limit of the repetitive comparison;

means connected to said execution control circuit and responsive to said watching instruction for detecting whether the repetitive comparison caused by said execution control circuit has reached the upper limit indicated by the information held by said limit register; and an end judgement circuit connected to said first comparator and said detecting means for terminating execution of said watching instruction for synchronization either when a result of comparison by said first comparator has become said predetermined value or when repeating of comparison by said first comparator has reached the upper limit indicated by the information held in said limit register.

* * * * *